(12) United States Patent
Kiyose

(10) Patent No.: US 8,847,918 B2
(45) Date of Patent: Sep. 30, 2014

(54) OPTICAL POSITION DETECTION DEVICE AND DISPLAY DEVICE WITH POSITION DETECTION FUNCTION

(75) Inventor: Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 319 days.

(21) Appl. No.: 12/962,186

(22) Filed: Dec. 7, 2010

(65) Prior Publication Data

US 2011/0134081 A1    Jun. 9, 2011

(30) Foreign Application Priority Data

Dec. 9, 2009   (JP) ................................. 2009-279202

(51) Int. Cl.
  *G06F 3/041*  (2006.01)
  *G01C 21/02*  (2006.01)
  *G06F 3/042*  (2006.01)

(52) U.S. Cl.
  CPC ..................................... *G06F 3/0421* (2013.01)
  USPC ...... 345/175; 250/221; 250/206.1; 250/206.2

(58) Field of Classification Search
  USPC ...................... 345/175; 250/221, 206.1–206.2
  See application file for complete search history.

(56) References Cited

U.S. PATENT DOCUMENTS

| 5,666,037 | A | 9/1997 | Reime |
| 5,726,547 | A | 3/1998 | Reime |
| 6,927,384 | B2 | 8/2005 | Reime et al. |
| 6,953,926 | B2 | 10/2005 | Reime |
| 2004/0201579 | A1* | 10/2004 | Graham ........................ 345/175 |
| 2005/0035943 | A1 | 2/2005 | Kojima |
| 2005/0224582 | A1 | 10/2005 | Aiki et al. |
| 2007/0046902 | A1 | 3/2007 | Yajima |
| 2008/0096651 | A1 | 4/2008 | Okada |
| 2009/0058833 | A1* | 3/2009 | Newton ........................ 345/175 |
| 2009/0213093 | A1* | 8/2009 | Bridger ........................ 345/175 |
| 2009/0295744 | A1 | 12/2009 | Onishi |
| 2009/0295755 | A1* | 12/2009 | Chapman et al. ............. 345/175 |
| 2010/0020334 | A1 | 1/2010 | Nakanishi |
| 2010/0245289 | A1* | 9/2010 | Svajda ........................ 345/175 |
| 2011/0032215 | A1* | 2/2011 | Sirotich et al. ................ 345/175 |
| 2011/0134080 | A1 | 6/2011 | Kiyose |
| 2012/0068974 | A1* | 3/2012 | Ogawa ........................ 345/175 |

FOREIGN PATENT DOCUMENTS

| JP | 05-080935 | 4/1993 |
| JP | 2003-526236 A | 9/2003 |
| JP | 2003-534554 | 11/2003 |
| JP | 2004-535740 A | 11/2004 |
| JP | 2005-056088 A | 3/2005 |
| JP | 2007-048135 A | 2/2007 |
| JP | 2007-052497 A | 3/2007 |
| WO | WO-01-54276 A1 | 7/2001 |
| WO | WO-03-009476 A1 | 1/2003 |

* cited by examiner

*Primary Examiner* — Jonathan Boyd
(74) *Attorney, Agent, or Firm* — Harness, Dickey & Pierce, P.L.C.

(57) ABSTRACT

An optical position detection device includes: a detecting light source section adapted to emit a detection light beam; a light source drive section adapted to drive the detecting light source section to form an X-coordinate detecting light intensity distribution in which an intensity of the detection light beam varies in an X-axis direction, and a Y-coordinate detecting light intensity distribution in which an intensity of the detection light beam varies in a Y-axis direction intersecting the X-axis direction; a light detection section adapted to receive the detection light beam reflected by a target object; and a position detection section adapted to detect a position of the target object based on a reception intensity in the light detection section.

9 Claims, 15 Drawing Sheets

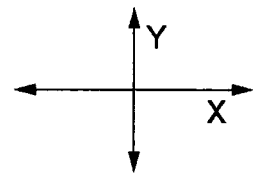

OPTICAL POSITION DETECTION DEVICE AND DISPLAY DEVICE WITH POSITION DETECTION FUNCTION

BACKGROUND

1. Technical Field

The present invention relates to an optical position detection device capable of optically detecting the position of a target object in a detection area, and a display device with a position detection function provided with the optical position detection device.

2. Related Art

As the optical position detection device for optically detecting the position of the target object, there is proposed, for example, a device (see, e.g., JP-T-2003-534554 (Document 1; the term "JP-T" as used herein means a published Japanese translation of a PCT patent application)) of emitting detection light beams respectively from two light beam sources toward the target object via a transmissive member, and then receiving the component of the detection light beams, which are reflected by the target object and transmitted through the transmissive member, by a common light detector.

In the configuration described in Document 1 mentioned above, the position of the target object is detected based on the ratio between the emission intensities of the detection light beams when controlling the two light beam sources so that the reception intensity of the light detector in the case in which the detection light beam emitted from one of the two light beam sources is reflected by the target object and the reception intensity of the light detector in the case in which the detection light beam emitted from the other of the two light beam sources is reflected by the target object become equal to each other.

Here, the inventors study the optical position detection device capable of detecting the two-dimensional coordinate, and further the three-dimensional coordinate of the target object located in the detection area, and the configuration of the Document 1 uses a method of using the spatial relationship between the detection light beams respectively emitted from the two beam sources, and therefore has a problem that only the one-dimensional coordinate can be detected but detection of the two-dimensional coordinate is not achievable.

SUMMARY

An advantage of some aspects of the invention is to provide an optical position detection device capable of detecting at least two-dimensional coordinate of a target object, and a display device with a position detection function provided with the optical position detection device.

According to an aspect of the invention, there is provided an optical position detection device adapted to optically detect a position of a target object in a detection area, including a plurality of position detecting light sources adapted to emit detection light beams in respective directions along an X-Y plane of the detection area assuming that an X-axis direction, a Y-axis direction, and a Z-axis direction intersect each other, a light source drive section adapted to drive the position detecting light sources to form, in the detection area, an X-coordinate detecting light intensity distribution in which an intensity of the detection light beam varies in an X-axis direction, and a Y-coordinate detecting light intensity distribution in which an intensity of the detection light beam varies in a Y-axis direction, a light detector adapted to receive the detection light beam reflected by a target object in the detection area, and a position detection section adapted to detect at least the X-coordinate and the Y-coordinate of the target object based on the reception result in the light detector.

In the optical position detection device according to the aspect of the invention, the light source drive section drives the plurality of position detecting light sources to form, in the detection area, an X-coordinate detecting light intensity distribution in which an intensity of the detection light beam varies in the X-axis direction, and a Y-coordinate detecting light intensity distribution in which an intensity of the detection light beam varies in the Y-axis direction. Further, the light detector detects the detection light beam reflected by the target object in the detection area. Therefore, by previously figuring out the relationship between the position in the detection area and the intensity of the detection light beams, the position detection section can detect the X-coordinate and the Y-coordinate of the target object based on the reception result in the light detector. Further, since the Z-coordinate detecting light intensity distribution in which the intensity of the detection light beams varies in the Z-axis direction can be formed by combining the X-coordinate detecting light intensity distribution and the Y-coordinate detecting light intensity distribution, the position detection section can also detects the Z-coordinate of the target object based on the reception result of the light detector. Here, since the position detecting light sources emit the detection light beams in the directions along the X-Y plane, the range in the Z-axis direction in which the X-coordinate detecting light intensity distribution and the Y-coordinate detecting light intensity distribution are formed can be limited. Therefore, since the X-coordinate detecting light intensity distribution and the Y-coordinate detecting light intensity distribution can be formed in the range limited in the Z-axis direction as appropriate distributions, the X-coordinate and the Y-coordinate of the target object can be detected with a high accuracy.

In this aspect of the invention, it is preferable to adopt a configuration in which the light detector constitutes an optical unit together with at least one of the plurality of position detecting light sources. According to this configuration, assembling or the like of the optical position detection device becomes easy such that it is possible to position the light detector and at least one of the position detecting light sources integrally as the optical unit.

In this aspect of the invention, it is preferable that the optical unit is provided with a reference light source adapted to emit a reference light beam entering the light detector without passing through the detection area, and the light source drive section puts on the reference light source and the position detecting light source at the respective timings different from each other. According to the configuration described above, even in the case in which the light intensity distributions having the directions reverse to each other are not formed, the position detection using the differential between the reference light beam and the detection light beam can be performed. Further, it is possible to monitor the reference light beam and to use the result for setting the drive conditions of the position detecting light sources. In other words, in order for setting the drive conditions of the position detecting light sources, although it is possible to put on the position detecting light sources and monitor them with the light detector, in the condition in which the target object does not exist, the detection light beams do not enter the light detector even if the position detecting light sources are put on. However, if the reference light source is made to emit a light beam with the same conditions as the conditions with which the position detecting light sources are put on, the reference light beam with the intensity corresponding to the drive conditions to the position detecting light sources is monitored by the light detector as a result. Therefore, the drive conditions for the position detecting light sources can be set based on the monitoring result of the reference light beam.

In this aspect of the invention, it is possible to adopt a configuration of being provided with a plurality of light emitting elements having respective optical axes directed differently from each other.

In this aspect of the invention, it is possible to adopt a configuration of being provided with a pair of linear light source members disposed on both sides sandwiching the detection area in the X-axis direction and extending in the Y-axis direction as the plurality of position detecting light sources.

In this aspect of the invention, it is possible to adopt a configuration in which the linear light source members are each provided with a plurality of light emitting elements arranged in the Y-axis direction.

In this aspect of the invention, it is possible to adopt a configuration in which the linear light source members are each provided with a first light emitting element, a first light guide member having an entrance section of the detection light beam emitted from the first light emitting element, and extending in the Y-axis direction, an inside of which the detection light beam emitted from the first light emitting element proceeds through in the Y-axis direction from one side to the other side, a second light emitting element, and a second light guide member having an entrance section of the detection light beam emitted from the second light emitting element, and extending in the Y-axis direction, an inside of which the detection light beam emitted from the second light emitting element proceeds through in the Y-axis direction from the other side to the one side.

In this aspect of the invention, it is preferable that the position detection section corrects the error due to the shift between the light intensity distribution formed actually and the relationship with the linear light intensity distribution to be a reference when detecting the position of the target object based on the reception result in the light detector. In this case, it is possible to adopt a configuration of correcting the position of the target object using the inverse function of the function defining the relationship between the reception intensity actually obtained via the light detector in each position of the detection area and the coordinate position on the detection area. Further, it is possible to adopt a configuration in which the position detection section previously stores the correction information for correcting the coordinate detection result in the case of assuming the light intensity distribution obtained actually as the linear relationship, and corrects the position of the target object based on the correction information.

The optical position detection device to which the invention is applied can be used for constituting a display device with a position detection function. In this case, the display device with a position detection function has an image generation device for displaying an image in an area overlapping the detection area in the Z-axis direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
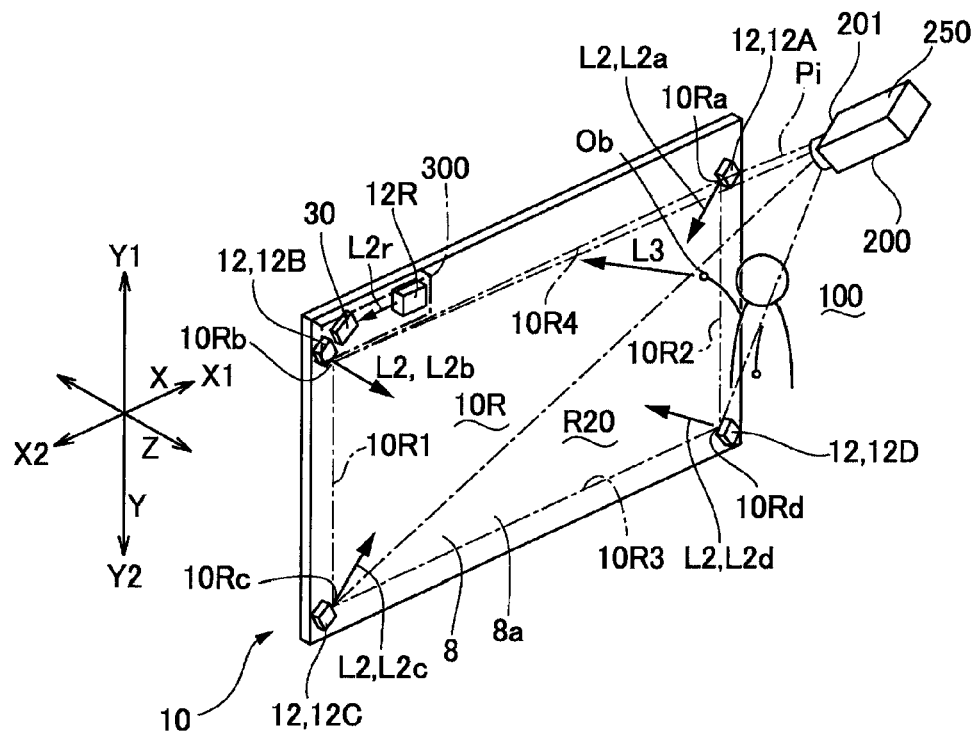
FIGS. 1A and 1B are explanatory diagrams schematically showing a configuration of a display device with a position detection function according to a first embodiment of the invention.

Hereinafter, some embodiments of the invention will be explained in detail with reference to the accompanying drawings. It should be noted that in the following explanation three arbitrary directions intersecting with each other are denoted as X-axis direction, Y-axis direction, and Z-axis direction, respectively. Further, in the drawings referred to below, things are shown with the X-axis oriented in the lateral direction, and the Y-axis oriented in the vertical direction for the sake of convenience of explanation. Further, in the drawings referred to below, things are shown assuming one side of the X-axis direction as an X1 side, the other side thereof as an X2 side, one side of the Y-axis direction as a Y1 side, and the other side thereof as a Y2 side. Further, in the drawings referred to in the explanation below, the scale ratios of the various layers and the various members may be set differently in order for illustrating the various layers and the various members in visible sizes on the drawings.

First Embodiment

Overall Configuration of Display Device with Position Detection Function

Figure 1B:
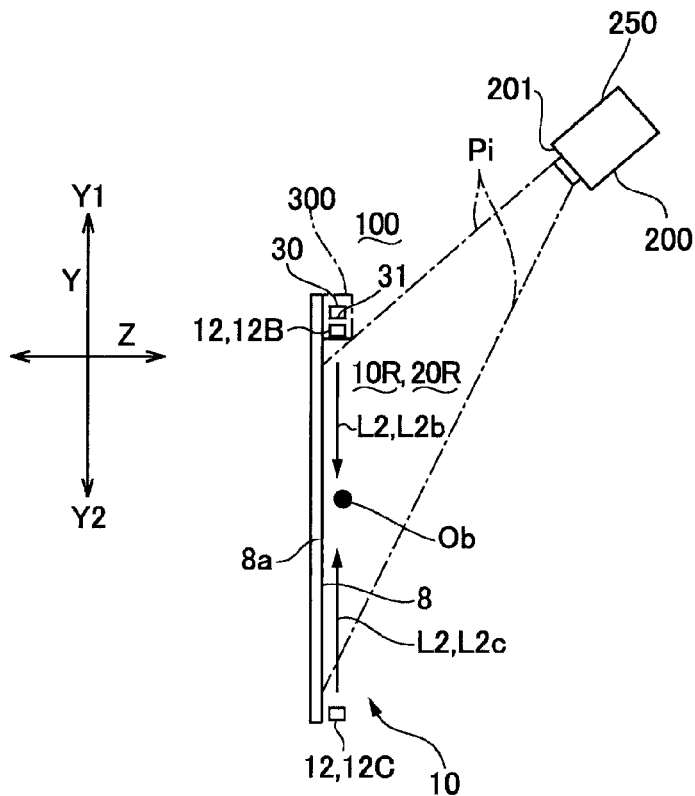

FIGS. 1A and 1B are explanatory diagrams schematically showing a configuration of a display device with a position detection function according to a first embodiment of the invention, wherein FIG. 1A is an explanatory diagram schematically showing an appearance of a substantial part of the display device with a position detection function viewed from obliquely above, and FIG. 1B is an explanatory diagram schematically showing an appearance thereof viewed from a lateral side.

The display device 100 with a position detection function shown in FIGS. 1A and 1B is configured as a projection display device provided with an image projection device 200 (an image generation device) called a liquid crystal projector or a digital micromirror device, and a screen member 8 spreading in X-Y plane directions. The image projection device 200 projects an image display light beam Pi in an enlarged manner from a projection lens system 210 provided to a front face section 201 of a housing 250 toward a screen surface 8a of the screen member 8.

The display device 100 with a position detection function according to the present embodiment is provided with an optical position detection device 10, and the optical position detection device 10 is provided with a function of optically detecting the position of the target object Ob in a detection area 10R set on the side of the screen surface 8a (in front of the screen member 8). In the present embodiment, the detection area 10R is an area having a rectangular shape with four sides 10R1 through 10R4 and four corner portions 10Ra through 10Rd when viewed in the normal line direction with respect to the screen member 8, and overlaps an area (an image display area 20R) to which the image is projected by the image projection device 200 in the screen member 8.

The optical position detection device 10 according to the present embodiment detects the position (the X-coordinate and the Y-coordinate) of the target object Ob in the X-Y plane (the detection plane) parallel to the screen member 8 in the detection area 10R. Therefore, it is possible for the display device 100 with a position detection function to treat, for example, the result of detection of the (X,Y)-coordinate of the target object Ob in the optical position detection device 10 as, for example, input information for designating, for example, a part of the image thus projected, and to perform, for example, switching of the image based on the input information.

Further, the optical position detection device 10 according to the present embodiment also detects the position (the Z-coordinate) of the target object Ob in the Z-axis direction as the normal line direction with respect to the screen member 8. Therefore, the optical position detection device 10 according to the present embodiment can also perform the process of, for example, regarding only the (X,Y)-coordinate of the target object Ob located within a predetermined range in the Z-axis direction from the screen member 8 as the input information.

Configuration of Optical Position Detection Device 10

The optical position detection device 10 according to the present embodiment is provided with a plurality of position detecting light sources 12 for emitting detection light beams L2 to the detection area 10R in the directions along the X-Y plane (the screen surface 8a), and a light detector 30 for detecting detection light beams L3 reflected by the target object Ob in the detection area 10R. In the present embodiment, the optical position detection device 10 is provided with four light emitting elements (light emitting elements 12A, 12B, 12C, and 12D) respectively having light axes directed differently from each other as the plurality of position detecting light sources 12, and all of the four light emitting elements (the light emitting elements 12A, 12B, 12C, and 12D) have the respective light axes directed along the X-Y plane (the screen surface 8a). More specifically, all of the four light emitting elements (the light emitting elements 12A, 12B, 12C, and 12D) have the respective light axes directed in parallel to the X-Y plane (the screen surface 8a). Therefore, the detection light beams L2 emitted from the respective position detecting light source 12 proceed along the X-Y plane (the screen surface 8a).

In the present embodiment, the four position detecting light sources 12 (the light emitting elements 12A, 12B, 12C, and 12D) have the respective light axes directed toward the respective four corner portions 10Ra through 10Rd of the detection area 10R. More specifically, the light emitting element 12A has the light axis directed toward the corner portion 10Ra of the detection area 10R, and emits the detection light beam L2a from the side of the corner portion 10Ra to the detection area 10R. The light emitting element 12B has the light axis directed toward the corner portion 10Rb of the detection area 10R, and emits the detection light beam L2b from the side of the corner portion 10Rb to the detection area 10R. The light emitting element 12C has the light axis directed toward the corner portion 10Rc of the detection area 10R to emit the detection light beam L2c from the side of the corner portion 10Rc to the detection area 10R, and the light emitting element 12D has the light axis directed toward the corner portion 10Rd of the detection area 10R to emit the detection light beam L2d from the side of the corner portion 10Rd to the detection area 10R.

The light emitting elements 12 are each composed of a light emitting diode (LED) or the like, and each discharge the detection light beam L2, which is an infrared light beam, as a diverging light beam. In other words, since the detection light beams L2 each preferably have a wavelength range efficiently reflected by the target object Ob such as a finger or a stylus pen, if the target object Ob is a human body such as a finger, the detection light beams L2 are preferably infrared light beams (in particular near infrared light beams near the visible light region, for example, those with a wavelength of around 850 nm or 950 nm) having high reflectance on a surface of a human body. In the present embodiment, either of the light emitting elements 12 emits an infrared light beam having a peak wavelength in the wavelength band around 850 nm.

The light detector 30 is composed of a light receiving element such as a photodiode or a phototransistor, and is disposed on the side of the screen surface 8a of the screen member 8 and outside the detection area 10R, having a light receiving section 31 directed along the screen surface 8a.

Here, the light detector 30 is disposed at the corner portion 10Rb of the detection area 10R similarly to the light emitting element 12B. Further, the light detector 30 is unitized as an optical unit 300 together with the light emitting element 12B. The unitization mentioned here denotes a form in which constituents of the unit can be treated integrally.

Further, the optical unit 300 is also provided with a reference light source 12R for emitting a reference light beam L2r directly entering the light detector 30 without passing through the detection area 10R. The reference light source 12R is composed of a light emitting diode for emitting an infrared light beam similarly to the light emitting elements 12A, 12B, 12C, and 12D.

The optical unit 300 is provided with a case (not shown) for covering the light emitting element 12B, the light detector 30, and the reference light source 12R, and the reference light beam L2r emitted from the reference light source 12R enters the light detector 30 without leaking to the detection area 10R. It should be noted that the case is provided with an opening. Therefore, the light emitting element 12B can emit the detection light beam L2b to the detection area 10R via the opening of the case. Further, the detection light beams L3 reflected by the target object Ob in the detection area 10R can enter the light detector 30 via the opening.

Electrical Configuration of Optical Position Detection Device 10

Figure 2:
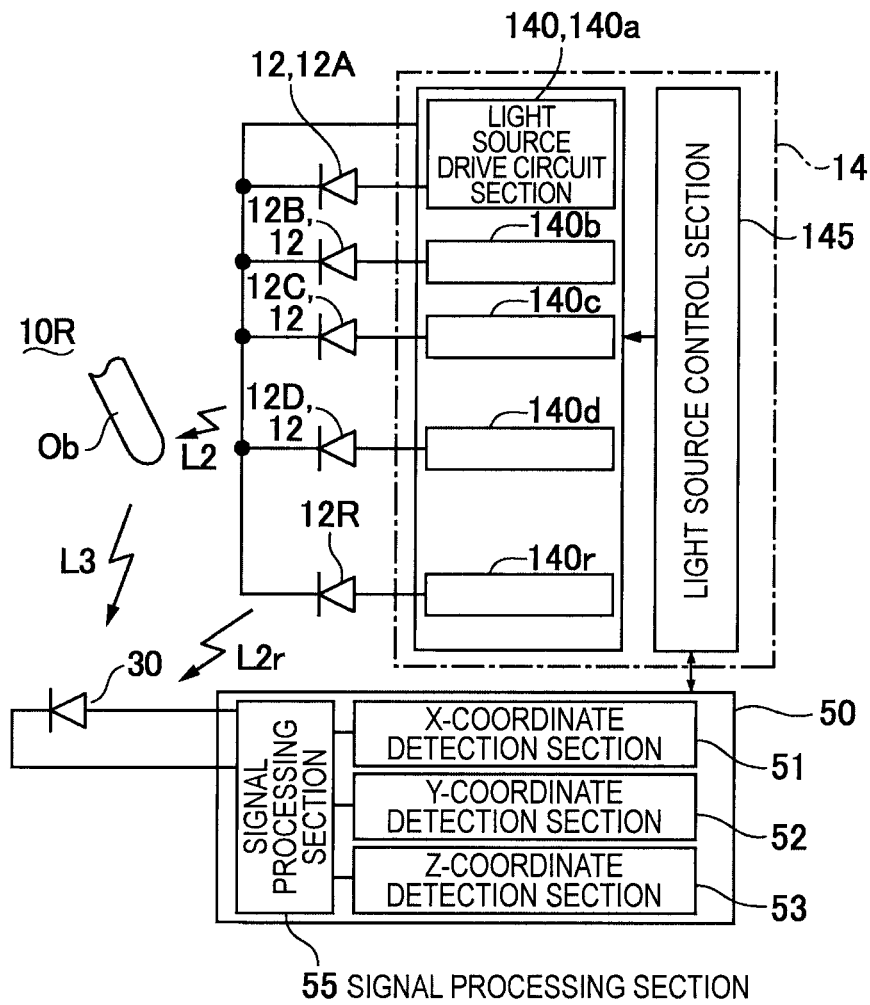
FIG. 2 is an explanatory diagram showing an electrical configuration of the optical position detection device used in the display device with a position detection function according to the first embodiment of the invention.

FIG. 2 is an explanatory diagram showing an electrical configuration of the optical position detection device 10 used in the display device 100 with a position detection function according to the first embodiment of the invention.

As shown in FIG. 2, the optical position detection device 10 has a light source drive section 14 for driving the position detecting light sources 12 (the light emitting elements 12A through 12D) and the reference light source 12R, and a position detection section 50 to which the detection result is output from the light detector 30. The light source drive section 14 is provided with light source drive circuit section 140 for driving the position detecting light sources (the light emitting elements 12A through 12D) and the reference light source 12R, and a light source control section 145 for controlling the emission intensity of each of the position detecting light sources 12 (the light emitting elements 12A through 12D) and the reference light source 12R via the light source drive circuit section 140. The light source drive circuit section 140 is provided with light source drive circuits 140a through 140d, and 140r for respectively driving the position detecting light sources 12 (the light emitting elements 12A through 12D) and the reference light source 12R, and the light source control section 145 controls the position detecting light sources 12 (the light emitting elements 12A through 12D) and the reference light source 12R via the respective light source drive circuits 140a through 140d, and 140r.

The position detection section 50 is provided with a signal processing section 55, an X-coordinate detection section 51, a Y-coordinate detection section 52, and a Z-coordinate detection section 53, and the X-coordinate detection section 51, the Y-coordinate detection section 52, and the Z-coordinate detection section 53 detect the X-coordinate, Y-coordinate, and Z-coordinate of the target object Ob based on the detection result in the light detector 30. The light source control section 145 and the position detection section 50 are connected to each other with a signal line, and the drive of the light emitting elements 12 and the detection operation in the position detection section 50 are performed in conjunction with each other.

Light Intensity Distribution of Detection Light Beams L2

FIGS. 3A through 3D are explanatory diagrams of the detection light beams L2 used in the optical position detection device 10 according to the first embodiment of the invention.

In the optical position detection device 10 according to the present embodiment, the light emitting elements 12A through 12D are disposed at positions respectively facing the corner portions 10Ra through 10Rd of the detection area 10R, and have respective light axes directed to the corner portions 10Ra through 10Rd. Further, the detection light beams L2a through L2d emitted from the light emitting elements 12A through 12D are each a diverging light beam, and such a diverging light beam has the highest intensity around the light axis, and the intensity is lowered continuously as the distance from the light axis increases. Further, the detection light beams L2a through L2d have the intensities continuously lowered as the distances from the light emitting elements 12A through 12D increase, respectively.

Figure 3A:
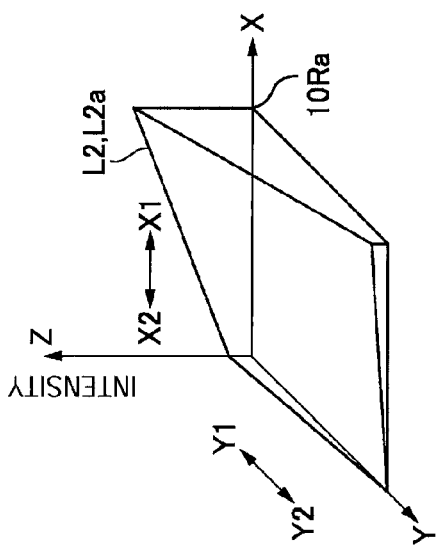
FIGS. 3A through 3D are explanatory diagrams of detection light beams used in the optical position detection device according to the first embodiment of the invention.

Therefore, the detection light beam L2a emitted from the light emitting element 12A forms the light intensity distribution shown in FIG. 3A in the detection area 10R. In such a light intensity distribution, the highest intensity portion appears at the corner portion 10Ra, and the intensity decreases monotonically as the distance from the highest intensity portion increases. In the light intensity distribution according to the present embodiment, the intensity decreases linearly or substantially linearly as the distance from the highest intensity portion increases. The detection light beam L2b emitted from the light emitting element 12B forms the light intensity distribution shown in FIG. 3B in the detection area 10R. In such a light intensity distribution, the highest intensity portion appears at the corner portion 10Rb, and the intensity decreases monotonically as the distance from the highest intensity portion increases. In the light intensity distribution according to the present embodiment, the intensity decreases linearly or substantially linearly as the distance from the highest intensity portion increases. The detection light beam L2c emitted from the light emitting element 12C forms the light intensity distribution shown in FIG. 3C in the detection area 10R. In such a light intensity distribution, the highest intensity portion appears at the corner portion 10Rc, and the intensity decreases monotonically as the distance from the highest intensity portion increases. In the light intensity distribution according to the present embodiment, the intensity decreases linearly or substantially linearly as the distance from the highest intensity portion increases. The detection light beam L2d emitted from the light emitting element 12D forms the light intensity distribution shown in FIG. 3D in the detection area 10R. In such a light intensity distribution, the highest intensity portion appears at the corner portion 10Rd, and the intensity decreases monotonically as the distance from the highest intensity portion increases. In the light intensity distribution according to the present embodiment, the intensity decreases linearly or substantially linearly as the distance from the highest intensity portion increases.

Coordinate Detecting Light Intensity Distribution

Figure 4A:
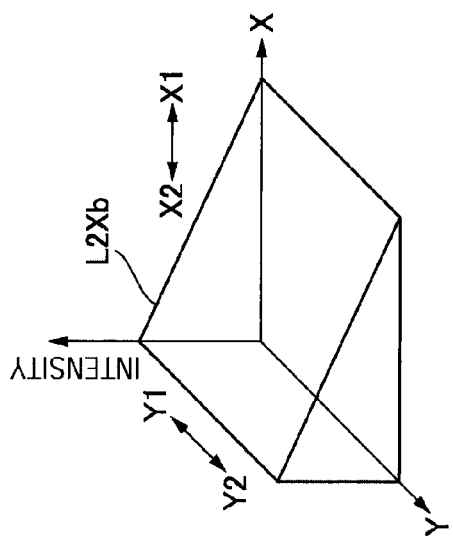
FIGS. 4A through 4D are explanatory diagrams showing how light intensity distributions of the detection light beams are formed in the optical position detection device according to the first embodiment of the invention.
Figure 4B:
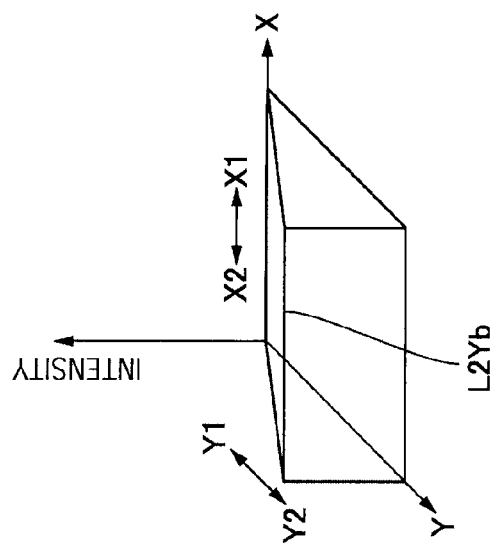
Figure 4C:
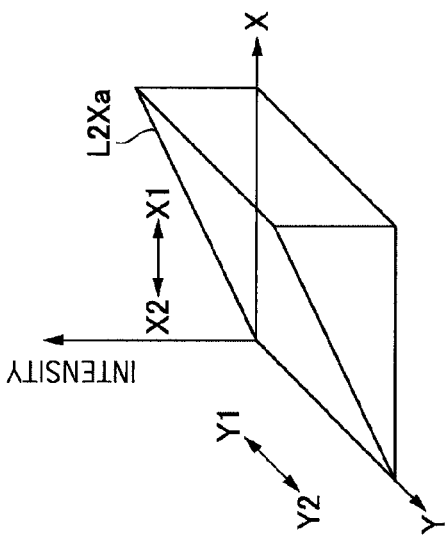
Figure 4D:
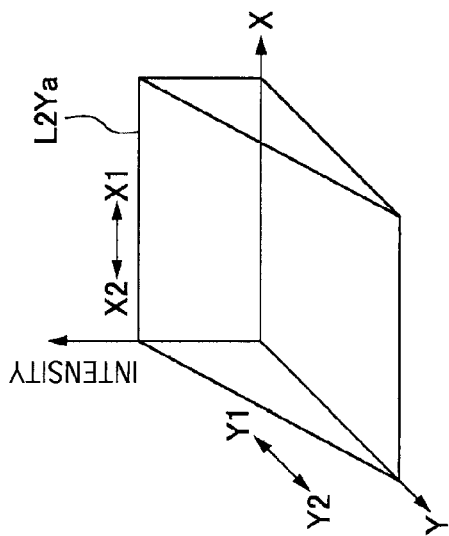

FIGS. 4A through 4D are explanatory diagrams showing formation of the light intensity distributions of the detection light beams L2 in the optical position detection device 10 according to the first embodiment of the invention, wherein FIGS. 4A and 4B are explanatory diagrams of the X-coordinate detecting light intensity distributions used when detecting the X-coordinate of the target object Ob, and FIGS. 4C and 4D are explanatory diagrams of the Y-coordinate detecting light intensity distribution used when the Y-coordinate of the target object Ob.

In the optical position detection device 10 according to the present embodiment, in order for detecting the (X,Y)-coordinate of the target object Ob in the detection area 10R, the X-coordinate is detected using an X-coordinate detecting first period and an X-coordinate detecting second period described below, and the Y-coordinate is detected using a Y-coordinate detecting first period and a Y-coordinate detecting second period. Therefore, how the light intensity distributions of the detection light beams L2 are formed in the optical position detection device 10 according to the first embodiment of the invention will be explained with reference to FIGS. 4A through 4D.

X-Coordinate Detecting Light Intensity Distribution

Figure 3B:
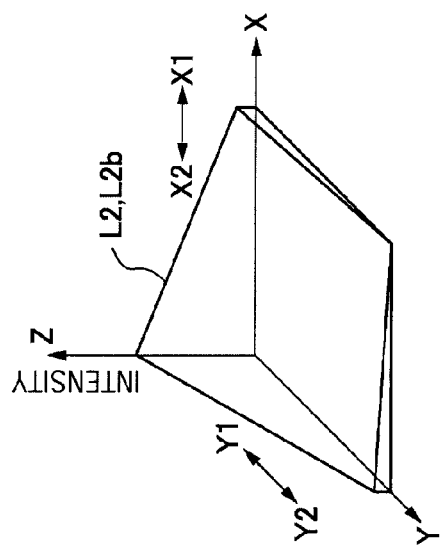
Figure 3C:
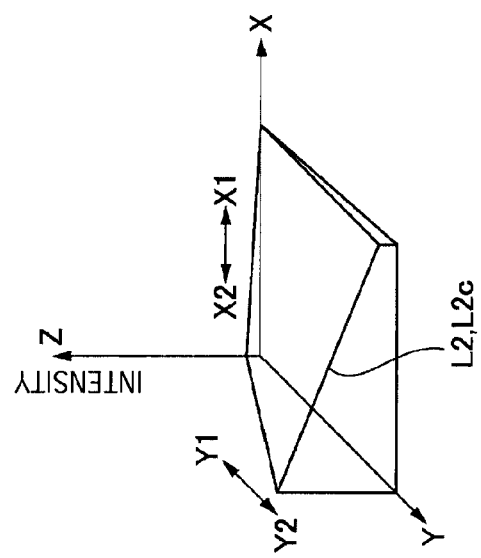
Figure 3D:
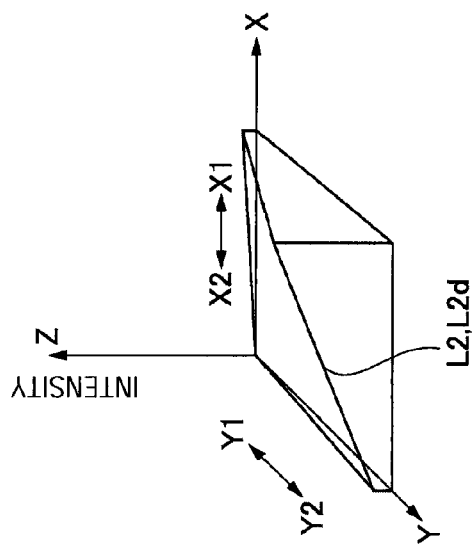

In the optical position detection device 10 according to the present embodiment, in order for detecting the X-coordinate of the target object Ob, firstly, in the X-coordinate detecting first period, the light source control section 145 of the light source drive section 14 shown in FIG. 2 controls the drive circuit section 140 to put on the light emitting elements 12A, 12D, and at the same time to put off the light emitting elements 12B, 12C. As a result, since the light intensity distribution shown in FIG. 3A and the light intensity distribution shown in FIG. 3D are combined, there is formed an X-coordinate detecting first light intensity distribution L2Xa in which the intensity of the detection light beams L2 decreases monotonically in the X-axis direction from the one side X1 to the other side X2 as shown in FIG. 4A. In the X-coordinate detecting first light intensity distribution L2Xa of the present embodiment, the intensity of the detection light beams L2 decreases continuously in the X-axis direction from the one side X1 toward the other side X2 in a substantially linear manner. In such an X-coordinate detecting first light intensity distribution L2Xa, the position in the X-axis direction and the intensity of the detection light beams L2 have a certain relationship. Further, in the X-coordinate detecting first light intensity distribution L2Xa, the intensity of the detection light beams L2 is constant in the Y-axis direction. Therefore, the amount of the light reflected by the target object Ob and then detected by the light detector 30 is a value proportional to the intensity of the detection light beams L2 in the X-coordinate detecting first light intensity distribution L2Xa, and defined by the position of the target object Ob in the X-axis direction.

Then, in the X-coordinate detecting second period, the light source control section 145 of the light source drive section 14 shown in FIG. 2 controls the drive circuit section 140 to put off the light emitting elements 12A, 12D, and at the same time to put on the light emitting elements 12B, 12C. As a result, since the light intensity distribution shown in FIG. 3B and the light intensity distribution shown in FIG. 3C are combined, there is formed an X-coordinate detecting second light intensity distribution L2Xb in which the intensity of the detection light beams L2 decreases monotonically in the X-axis direction from the other side X2 to the one side X1 as shown in FIG. 4B. In the X-coordinate detecting second light intensity distribution L2Xb of the present embodiment, the intensity of the detection light beams L2 decreases continuously in the X-axis direction from the other side X2 toward the one side X1 in a substantially linear manner. In such an X-coordinate detecting second light intensity distribution L2Xb, the position in the X-axis direction and the intensity of the detection light beams L2 have a certain relationship. Further, in the X-coordinate detecting second light intensity distribution L2Xb, the intensity of the detection light beams L2 is constant in the Y-axis direction. Therefore, the amount of the light reflected by the target object Ob and then detected by the light detector 30 is a value proportional to the intensity of the detection light beams L2 in the X-coordinate detecting second light intensity distribution L2Xb, and defined by the position of the target object Ob in the X-axis direction.

Y-Coordinate Detecting Light Intensity Distribution

In order for detecting the Y-coordinate of the target object Ob in the detection area 10R, firstly, in the Y-coordinate detecting first period, the light source control section 145 of the light source drive section 14 shown in FIG. 2 controls the drive circuit section 140 to put on the light emitting elements 12A, 12B, and at the same time to put off the light emitting elements 12C, 12D. As a result, since the light intensity distribution shown in FIG. 3A and the light intensity distribution shown in FIG. 3B are combined, there is formed a Y-coordinate detecting first light intensity distribution L2Ya in which the intensity of the detection light beams L2 decreases monotonically in the Y-axis direction from the one side Y1 to the other side Y2 as shown in FIG. 4C. In the Y-coordinate detecting first light intensity distribution L2Ya of the present embodiment, the intensity of the detection light beams L2 decreases continuously in the Y-axis direction from the one side Y1 toward the other side Y2 in a substantially linear manner. In such a Y-coordinate detecting first light intensity distribution L2Ya, the position in the Y-axis direction and the intensity of the detection light beams L2 have a certain relationship. Further, in the Y-coordinate detecting first light intensity distribution L2Ya, the intensity of the detection light beams L2 is constant in the X-axis direction. Therefore, the amount of the light reflected by the target object Ob and then detected by the light detector 30 is a value proportional to the intensity of the detection light beams L2 in the Y-coordinate detecting first light intensity distribution L2Ya, and defined by the position of the target object Ob in the Y-axis direction.

Then, in the Y-coordinate detecting second period, the light source control section 145 of the light source drive section 14 shown in FIG. 2 controls the drive circuit section 140 to put off the light emitting elements 12A, 12B, and at the same time to put on the light emitting elements 12C, 12D. As a result, since the light intensity distribution shown in FIG. 3C and the light intensity distribution shown in FIG. 3D are combined, there is formed a Y-coordinate detecting second light intensity distribution L2Yb in which the intensity of the detection light beams L2 decreases monotonically in the Y-axis direction from the other side Y2 to the one side Y1 as shown in FIG. 4D. In the Y-coordinate detecting second light intensity distribution L2Yb of the present embodiment, the intensity of the detection light beams L2 decreases continuously in the Y-axis direction from the other side Y2 toward the one side Y1 in a substantially linear manner. In such a Y-coordinate detecting second light intensity distribution L2Yb, the position in the Y-axis direction and the intensity of the detection light beams L2 have a certain relationship. Further, in the Y-coordinate detecting second light intensity distribution L2Yb, the intensity of the detection light beams L2 is constant in the X-axis direction. Therefore, the amount of the light reflected by the target object Ob and then detected by the light detector 30 is a value proportional to the intensity of the detection light beams L2 in the Y-coordinate detecting second light intensity distribution L2Yb, and defined by the position of the target object Ob in the Y-axis direction.

Z-Coordinate Detecting Light Intensity Distribution

In the optical position detection device 10 according to the present embodiment, in order for detecting the Z-coordinate of the target object Ob in the detection area 10R, all of the light emitting elements 12A through 12D are put on. As a result, there is formed a Z-coordinate detecting light intensity distribution in which the intensity of the detection light beams L2 decreases monotonically in a direction of increasing the distance from the screen member 8 along the Z-axis direction. In such a Z-coordinate detecting light intensity distribution, the position in the Z-axis direction and the intensity of the detection light beams L2 have a certain relationship. Therefore, the amount of the light reflected by the target object Ob and then detected by the light detector 30 is a value proportional to the intensity of the detection light beams L2 in the Z-coordinate detecting light intensity distribution, and defined by the position of the target object Ob in the Z-axis direction.

Fundamental Principle of (X,Y)-Coordinate Detection

In the display device 100 with a position detection function according to the present embodiment, the light intensity distributions explained with reference to FIGS. 4A through 4D are formed, and at the same time, the detection light beams L2 reflected by the target object Ob are detected with the light detector 30, and then the position detection section 50 detects the position of the target object Ob in the detection area 10R based on the detection result in the light detector 30. Therefore, the principle of the coordinate detection will be explained with reference to FIGS. 5A and 5B.

Figure 5A:
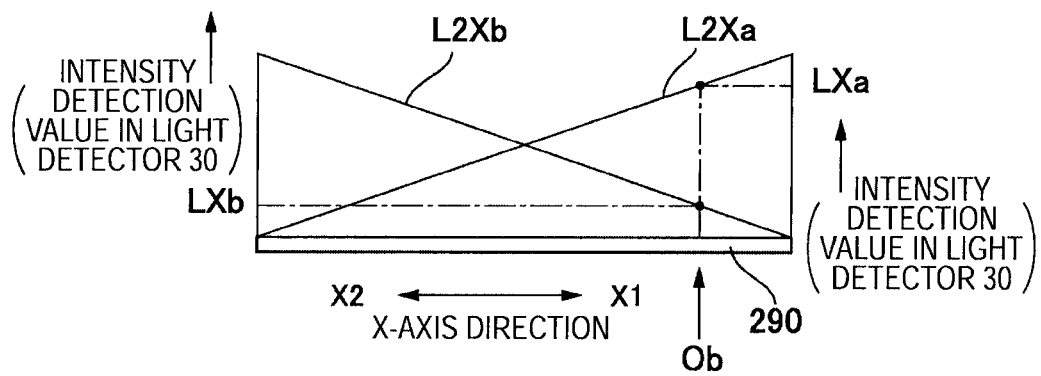
FIGS. 5A and 5B are explanatory diagrams schematically showing the principle of detecting the (X,Y)-coordinate in the optical position detection device to which the invention is applied.
Figure 5B:
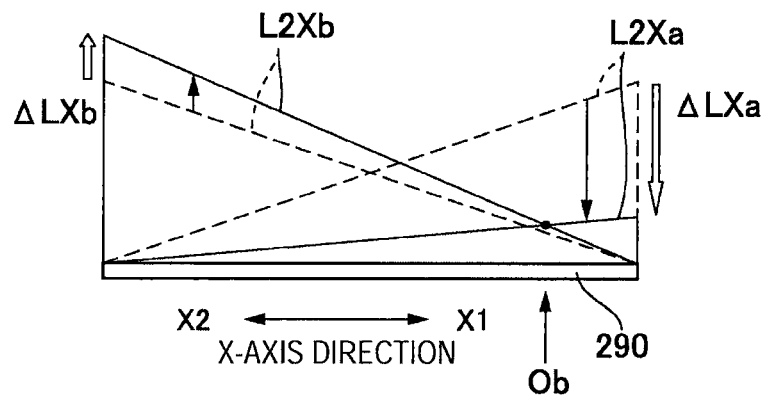

FIGS. 5A and 5B are explanatory diagrams showing the principle of the (X,Y)-coordinate detection in the optical position detection device 10 to which the invention is applied, wherein FIG. 5A is an explanatory diagram showing the intensity of the light reflected by the target object, and FIG. 5B is an explanatory diagram showing how the light intensity distributions of the detection light beams are adjusted so that the intensities of the detection light beams reflected by the target object become equal to each other.

Since the X-coordinate detecting first intensity distribution L2Xa and the X-coordinate detecting second intensity distribution L2Xb explained with reference to FIGS. 4A through 4D each have a certain distribution in the X-axis direction, it is possible to detect the X-coordinate of the target object Ob based on the detection result in the light detector 30 using, for example, the following method.

For example, a first method uses the difference between the X-coordinate detecting first light intensity distribution L2Xa and the X-coordinate detecting second light intensity distribution L2Xb shown in FIG. 5A. More specifically, since the X-coordinate detecting first light intensity distribution L2Xa and the X-coordinate detecting second light intensity distribution L2Xb are previously set to the predetermined distributions, the difference between the X-coordinate detecting first light intensity distribution L2Xa and the X-coordinate detecting second light intensity distribution L2Xb is also set previously to be a predetermined function. Therefore, by obtaining the difference between the detection value LXa in the light detector 30 when forming the X-coordinate detecting first light intensity distribution L2Xa in the X-coordinate detecting first period and the detection value LXb in the light detector 30 when forming the X-coordinate detecting second light intensity distribution L2Xb in the X-coordinate detecting second period, the X-coordinate detection section 51 of the position detection section 50 can detect the X-coordinate of the target object Ob. According to such a method, even in the case in which the environment light other than the detection light beams L2 such as the infrared component included in the outside light enters the light detector 30, the intensity of the infrared component included in the environment light is canceled out when obtaining the difference between the detection values LXa, LXb, and therefore, the infrared component included in the environment light never exerts an influence on the detection accuracy. It should be noted that it is also possible to detect the X-coordinate of the target object Ob based on the ratio between the detection value LXa and the detection value LXb.

Then, in a second method, the X-coordinate of the target object Ob is detected based on the adjustment value having been used when adjusting the control value (the drive current value) for the light emitting elements 12 so that the detection value LXa in the light detector 30 when forming the X-coordinate detecting first light intensity distribution L2Xa in the X-coordinate detecting first period and the detection value LXb in the light detector 30 when forming the X-coordinate detecting second light intensity distribution L2Xb in the X-coordinate detecting second period become equal to each other. Such a method can be applied to the case in which the intensity in the X-coordinate detecting first light intensity distribution L2Xa and the X-coordinate detecting second light intensity distribution L2Xb shown in FIG. 5A varies linearly with respect to the X-coordinate.

Firstly, as shown in FIG. 5A, the X-coordinate detecting first light intensity distribution L2Xa and the X-coordinate detecting second light intensity distribution L2Xb are formed alternately in the X-coordinate detecting first period and the X-coordinate detecting second period. It is understood that if the detection value LXa in the light detector 30 in the X-coordinate detecting first period and the detection value LXb in the light detector 30 in the X-coordinate detecting second period are equal to each other, the target object Ob is located at the center in the X-axis direction.

In contrast thereto, if the detection value LXa in the light detector 30 in the X-coordinate detecting first period and the detection value LXb in the light detector 30 in the X-coordinate detecting second period are different from each other, the control value (the drive current) to the light emitting elements 12 are adjusted so that the detection values LXa, LXb are equal to each other. For example, the control value (the drive current) to the light emitting elements 12B, 12C, which are kept ON during the X-coordinate detecting second period with the low detection value, is increased while the control value (the drive current) to the light emitting elements 12A, 12D, which are kept ON during the X-coordinate detecting first period with the high detection value, is decreased. In the example shown in FIG. 5B, the control value to the light emitting elements 12A, 12D in the X-coordinate detecting first period is decreased as much as the value corresponding to the adjustment value $\Delta$LXa, while the control value to the light emitting elements 12B, 12C in the X-coordinate detecting second period is increased as much as the value corresponding to the adjustment value $\Delta$LXb. Then, as shown in FIG. 5B, the X-coordinate detecting first light intensity distribution L2Xa is formed again in the X-coordinate detecting first period, and the X-coordinate detecting second light intensity distribution L2Xb is formed again in the X-coordinate detecting second period. As a result, if the detection value LXa in the light detector 30 in the X-coordinate detecting first period and the detection value LXb in the light detector 30 in the X-coordinate detecting second period become equal to each other, the X-coordinate of the target object Ob can be detected by the X-coordinate detection section 51 of the position detection section 50 based on the ratio, the difference, or the like between the adjustment value ΔLXa of the control value to the light emitting elements in the X-coordinate detecting first period and the adjustment value ΔLXb of the control value to the light emitting elements 12 in the X-coordinate detecting second period. According to such a method, even in the case in which the environment light other than the detection light beams L2 such as the infrared component included in the outside light enters the light detector 30, the intensity of the infrared component included in the environment light is canceled out when performing adjustment of the control values to the light emitting elements 12 so that the detection values LXa, LXb become equal to each other, and therefore, the infrared component included in the environment light never exerts an influence on the detection accuracy. It should be noted that although in the second method described above, the light source drive section 14 adjusts the control value (the drive current) to the light emitting elements 12A through 12D to thereby vary both of the X-coordinate detecting first light intensity distribution L2Xa and the X-coordinate detecting second light intensity distribution L2Xb, it is also possible to vary either one of the light intensity distributions.

Similarly, if the Y-coordinate detecting first light intensity distribution in which the intensity decreases monotonically in the Y-axis direction from the one side Y1 to the other side Y2 is formed in the Y-coordinate detecting first period, and then the Y-coordinate detecting second light intensity distribution in which the intensity decreases monotonically in the Y-axis direction from the other side Y2 to the one side Y1 is formed in the Y-coordinate detecting second period, the Y-coordinate detection section 52 of the position detection section 50 can detect the Y-coordinate of the target object Ob using the first method and the second method described above.

Principle of Detecting Z-Coordinate

Figure 6A:
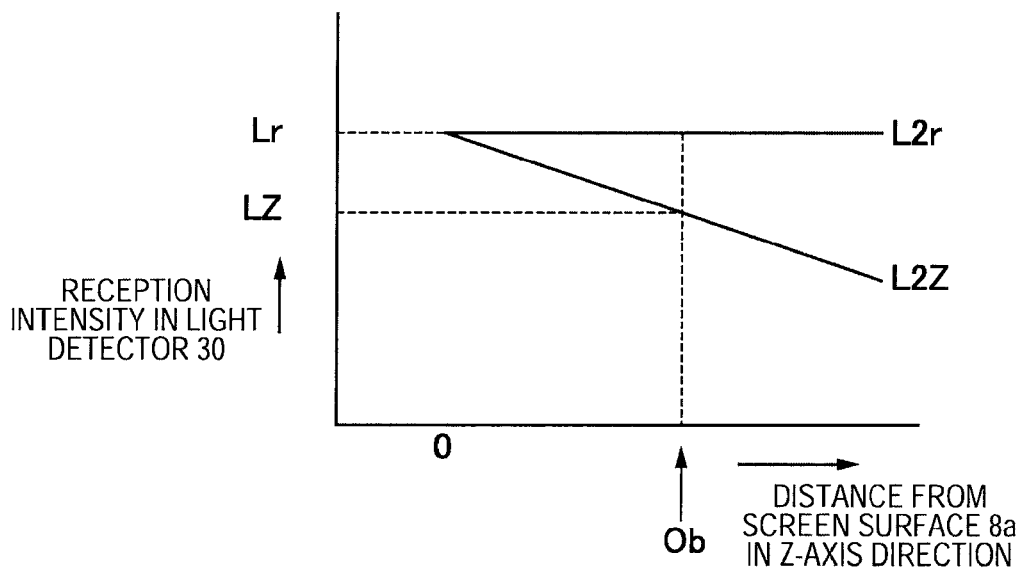
FIGS. 6A and 6B are explanatory diagrams showing the principle of detecting the Z-coordinate of the target object in the optical position detection device to which the invention is applied.
Figure 6B:
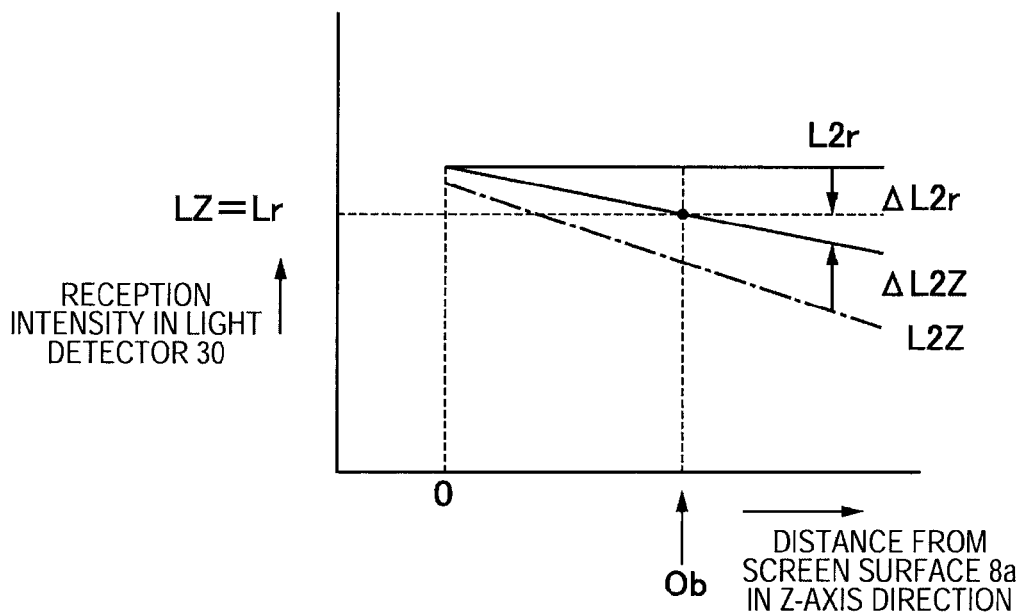

FIGS. 6A and 6B are explanatory diagrams showing the principle of detecting the Z-coordinate of the target object Ob in the optical position detection device 10 to which the invention is applied, wherein FIG. 6A is an explanatory diagram showing the light intensity distribution of the detection light beam in the Z-axis direction, and FIG. 6B is an explanatory diagram showing the light intensity distribution of the detection light beam adjusted so that the reception intensity of the detection light beam reflected by the target object Ob and the reception intensity of the reference light beam become equal to each other.

In the optical position detection device 10 according to the present embodiment, in order for detecting the Z-coordinate of the target object Ob in the detection area 10R, all of the light emitting elements 12A through 12D are put on. As a result, there is formed a Z-coordinate detecting light intensity distribution L2Z in which the intensity of the detection light beams L2 decreases monotonically in a direction of increasing the distance from the screen surface 8a along the Z-axis direction as shown in FIG. 6A. In such a Z-coordinate detecting light intensity distribution L2Z, the position in the Z-axis direction and the intensity of the detection light beams L2 have a certain relationship. Therefore, the amount of the light reflected by the target object Ob and then detected by the light detector 30 is a value proportional to the intensity of the detection light beams L2 in the Z-coordinate detecting light intensity distribution L2Z, and defined by the position of the target object Ob. Therefore, the Z-coordinate detection section 53 of the position detection section 50 can detect the Z-coordinate of the target object Ob based on the detection result of the light detector 30 in the Z-coordinate detection period.

Further, by using the differential between the light intensity distribution in the Z-axis direction and the reference light beam L2r emitted from the reference light source 12R, the Z-coordinate detection section 53 can detect the Z-coordinate of the target object Ob using the differential similarly to the method explained with reference to FIGS. 5A and 5B.

When detecting the Z-coordinate in the optical position detection device 10 according to the present embodiment, if all of the light emitting elements 12A through 12D are put on in the detection light beam detecting period, the Z-coordinate detecting light intensity distribution L2Z in which the intensity decreases monotonically in the Z-axis direction is formed in the detection area 10R as shown in FIG. 6A. In the present embodiment, in the Z-coordinate detecting light intensity distribution L2Z, the intensity decreases linearly as the distance from the linear light source member 120 increases, and in the X-axis direction and the Y-axis direction, the intensity is constant. Therefore, if the target object Ob is disposed in the detection area 10R in the detection light beam detecting period in the condition of putting on the light emitting elements 12 while putting off the reference light source 12R, the detection light beams L2 are reflected by the target object Ob, and some of the detection light beams L3 thus reflected are detected by the light detector 30. Here, the reception intensity LZ of the detection light beams L2 in the light detector 30 is proportional to the intensity corresponding to the position of the target object Ob in the Z-coordinate detecting light intensity distribution L2Z.

In contrast thereto, when the reference light source 12R is put on in the reference light beam detection period, the reference light beam L2r emitted from the reference light source 12R is partially detected by the light detector 30. Here, since the reference light beam L2r is never reflected by the target object Ob, the reception intensity Lr of the reference light beam L2r in the light detector 30 is constant irrespective of the position of the target object Ob as shown in FIG. 6A. In the example shown in FIG. 6A, the detection intensity of the reference light beam L2r in the light detector 30 is made equal to the intensity obtained when the light detector 30 detects the detection light beams L2 when the target object Ob is located at a position close to the screen surface 8a.

By using such a Z-coordinate detecting light intensity distribution L2Z and the reference light beam L2r, it is possible to detect the Z-coordinate of the target object Ob due to the principle similar to the second method explained with reference to FIGS. 5A and 5B. Specifically, as shown in FIG. 6B, the Z-coordinate of the target object Ob can be detected based on the adjustment value obtained when adjusting the control values (the drive current values) to the light emitting elements 12A through 12D and the control value (the drive current value) to the reference light source 12R so that the detection value LZ in the light detector 30 in the detection light beam detecting period and the detection value Lr in the light detector 30 in the reference light beam detection period become equal to each other. According to such a method, even in the case in which the environment light other than the detection light beams L2 such as the infrared component included in the outside light enters the light detector 30, the intensity of the infrared component included in the environment light is canceled out when performing adjustment of the control values to the light emitting elements 12A through 12D so that the detection values LZ, Lr become equal to each other, and therefore, the infrared component included in the environment light never exerts an influence on the detection accuracy.

When obtaining the position information (the X-coordinate, Y-coordinate, and Z-coordinate) of the target object Ob in the detection area 10R based on the detection result in the light detector 30 as described above, it is also possible to adopt a configuration of, for example, using a microprocessor unit (MPU) as the position detection section 50, and thus executing predetermined software (an operation program) by the microprocessor unit, thereby performing the process. Further, it is also possible to adopt a configuration of performing the process with a signal processing section using hardware such as a logic circuit.

Major Advantages of Present Embodiment

As explained hereinabove, in the optical position detection device 10 according to the present embodiment, the light source drive section 14 drives the plurality of position detecting light sources 12 (the light emitting elements 12A through 12D) to thereby form the X-coordinate detecting light intensity distributions (the X-coordinate detecting first light intensity distribution L2Xa and the X-coordinate detecting second light intensity distribution L2Xb) in which the intensity of the detection light beams varies in the X-axis direction, and the Y-coordinate detecting light intensity distributions (the Y-coordinate detecting first light intensity distribution L2Ya and the Y-coordinate detecting second light intensity distribution L2Yb) in which the intensity of the detection light beams varies in the Y-axis direction in the detection area 10R. Further, the light detector 30 detects the detection light beams L3 reflected by the target object Ob in the detection area 10R. Therefore, by previously figuring out the relationship between the position in the detection area 10R and the intensity of the detection light beams L2, the position detection section 50 can detect the X-coordinate and the Y-coordinate of the target object Ob based on the reception result in the light detector 30.

Further, since the Z-coordinate detecting light intensity distribution L2Z in which the intensity of the detection light beams varies in the Z-axis direction can be formed by combining the X-coordinate detecting light intensity distribution and the Y-coordinate detecting light intensity distribution, the position detection section 50 can also detects the Z-coordinate of the target object Ob based on the reception result of the light detector 30.

Here, since the position detecting light sources 12 (the light emitting elements 12A through 12D) emit the detection light beams L2 in the directions along the X-Y plane, the range in the Z-axis direction in which the X-coordinate detecting light intensity distribution and the Y-coordinate detecting light intensity distribution are formed can be limited. Therefore, since the X-coordinate detecting light intensity distribution and the Y-coordinate detecting light intensity distribution can be formed in the range limited in the Z-axis direction as appropriate distributions, the X-coordinate and the Y-coordinate of the target object Ob can be detected with a high accuracy. Further, since the light intensity distribution is formed within a certain limited range, the Z-coordinate detecting light intensity distribution L2Z can also be formed as an appropriate distribution. Therefore, the Z-coordinate of the target object Ob can be detected with a high accuracy.

Further, in the present embodiment the light detector 30 constitutes the optical unit 300 together with the light emitting element 12B out of the plurality of position detecting light sources 12 (the light emitting elements 12A through 12D). Further, the optical unit 300 is provided with the reference light source 12R. Therefore, assembling or the like of the optical position detection device 10 becomes easy such that it is possible to position the light detector 30, the light emitting element 12B, and the reference light source 12R integrally as the optical unit 300. In particular, by integrating the light detector 30 and the reference light source 12R as the optical unit 300, it is possible to set the incident light intensity of the reference light beam L2r with respect to the light detector 30 with a high accuracy.

Further, since the present embodiment is provided with the reference light source 12R, when detecting the Z-coordinate, the differential between the reference light beam L2r emitted from the reference light source 12R and the Z-coordinate detecting light intensity distribution L2Z can be used similarly to the detection of the X-coordinate and the Y-coordinate. Therefore, even in the case in which the environment light enters the light detector 30, the intensity of the infrared component included in the environment light is canceled out, and therefore, the infrared component included in the environment light never affects the detection accuracy.

Further, it is possible to monitor the reference light beam and to use the result for setting the drive conditions of the position detecting light sources 12. In other words, in order for setting the drive conditions of the position detecting light sources 12, although it is possible to put on the position detecting light sources 12 and monitor them with the light detector 30, in the condition in which the target object Ob does not exist, the detection light beams L2 do not enter the light detector 30 even if the position detecting light sources 12 are put on. However, if the reference light source 12R is made to emit a light beam with the same conditions as the conditions with which the position detecting light sources 12 are put on, the reference light beam L2r with the intensity corresponding to the drive conditions to the position detecting light sources 12 is monitored by the light detector 30 as a result. Therefore, the drive conditions for the position detecting light sources 12 can be set based on the monitoring result of the reference light beam L2r.

Further, the detection light beams L2 are each an infrared beam, and are therefore invisible. Therefore, there can also be obtained an advantage that the display of the image is not disturbed even in the case in which the method of optically detecting the target object Ob is adopted.

Second Embodiment

Overall Configuration

Figure 7A:
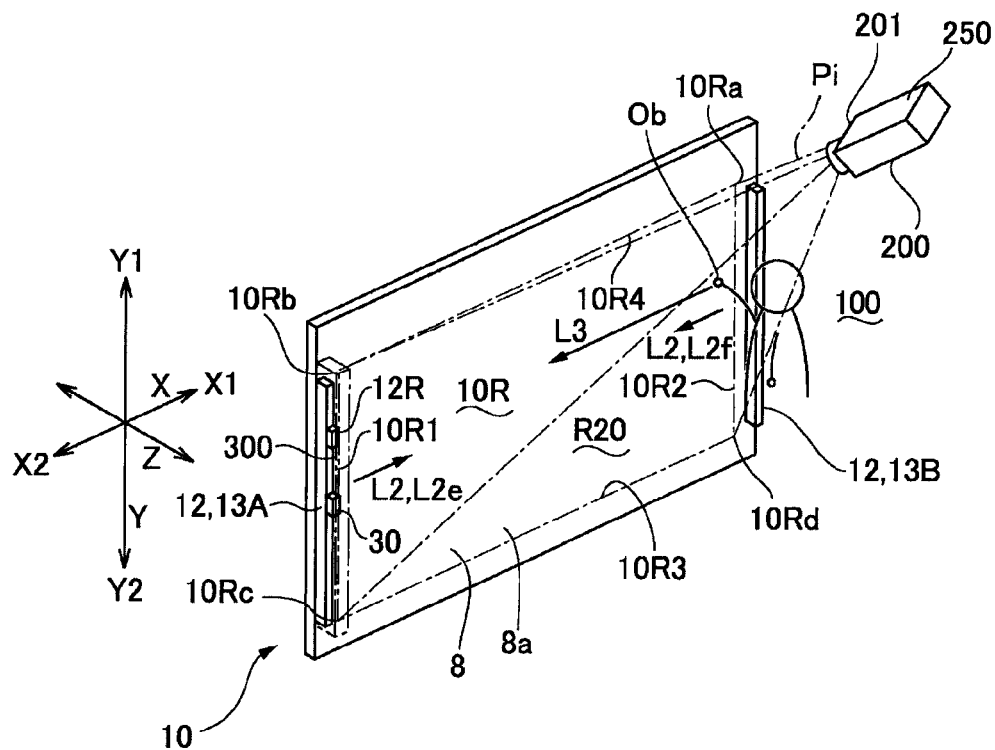
FIGS. 7A, 7B, and 7C are explanatory diagrams schematically showing a configuration of a display device with a position detection function according to a second embodiment of the invention.
Figures 7B, 7C:
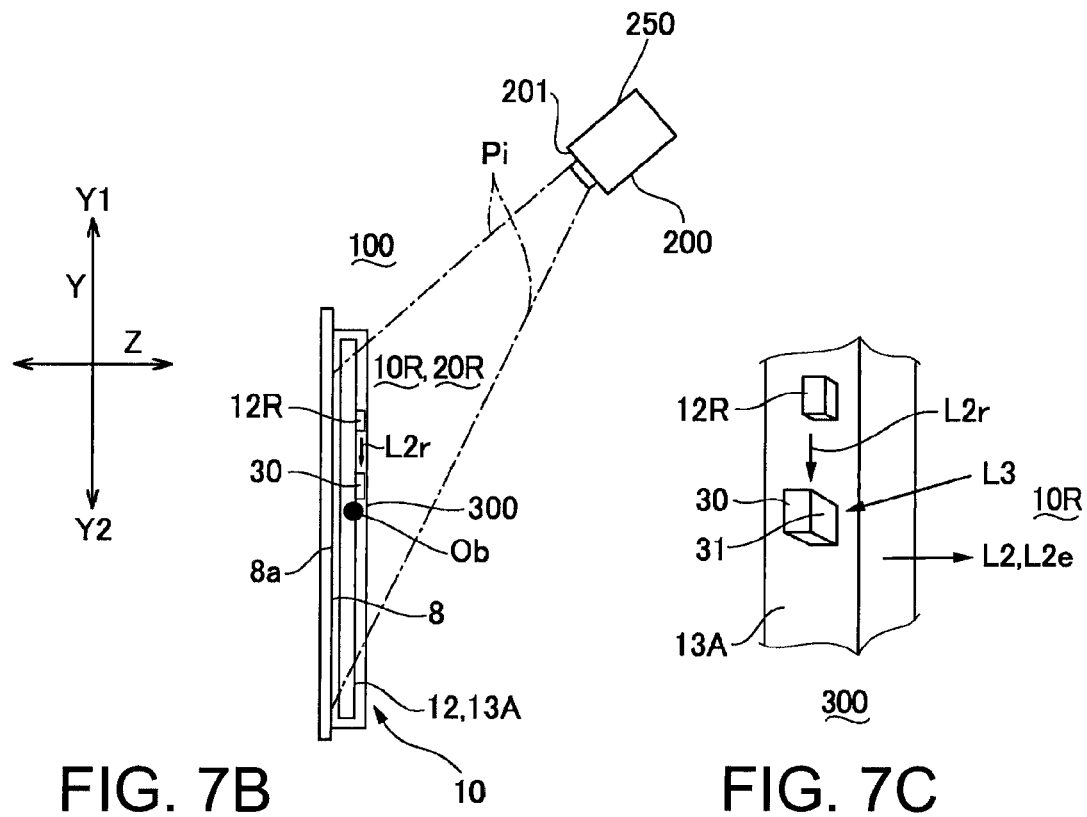

FIGS. 7A through 7C are explanatory diagrams schematically showing a configuration of a display device 100 with a position detection function according to a second embodiment of the invention, wherein FIG. 7A is an explanatory diagram schematically showing an appearance of a substantial part of the display device 100 with a position detection function viewed from obliquely above, FIG. 7B is an explanatory diagram schematically showing an appearance thereof viewed from a lateral side, and FIG. 7C is an explanatory diagram showing the periphery of the light detector (the periphery of the optical unit) in an enlarged manner. It should be noted that since the basic configuration of the present embodiment is substantially the same as in the first embodiment, common parts are denoted with the same reference symbols and the explanation therefor will be omitted.

As shown in FIGS. 7A and 7B, the display device 100 with a position detection function also has the configuration obtained by providing the optical position detection device 10 to the projection display device similarly to the case of the first embodiment. When configuring such an optical position detection device 10, although in the first embodiment the four light emitting elements 12A through 12D are used as the plurality of position detecting light sources 12 for emitting the detection light beams L2 to the detection area 10R, the optical position detection device 10 of the present embodiment is provided with a pair of linear light source members 13A, 13B disposed on both sides sandwiching the detection area 10R in the X-axis direction and extending in the Y-axis direction as the plurality of position detecting light sources 12. More specifically, the optical position detection device 10 is provided with the linear light source member 13A extending in the Y-axis direction along the side 10R1 of the detection area 10R and emitting the detection light beam L2 (a detection light beam L2e), and the linear light source member 13B extending in the Y-axis direction along the side 10R2 opposite to the side 10R1 in the detection area 10R and emitting the detection light beam L2 (a detection light beam L2f).

Further, the optical position detection device 10 is also provided with the light detector 30 in the present embodiment similarly to the first embodiment. Here, as shown in FIGS. 7A, 7B, and 7C, the light detector 30 forms the optical unit 300 together with the linear light source member 13A extending along the side 10R1 out of the plurality of position detection light sources 12 (the linear light source members 13A, 13B), and the light detector 30 is disposed at roughly the center of the side 10R1 in the Y-axis direction. Further, the optical unit 300 is also provided with the reference light source 12R, and the reference light source 12R emits the reference light beam L2r directly entering the light detector 30 without passing through the detection area 10R.

Configuration of Linear Light Source Members 13A, 13B

Figure 8:
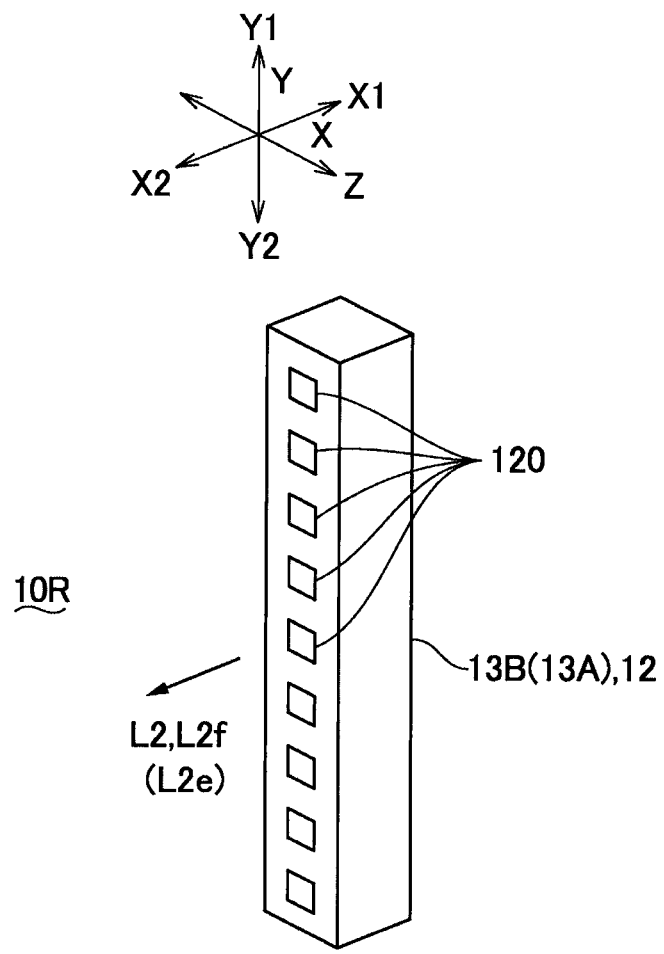
FIG. 8 is an explanatory diagram of a linear light source member used in an optical position detection device according to the second embodiment of the invention.

FIG. 8 is an explanatory diagram of each of the linear light source members 13A, 13B used in the optical position detection device 10 according to the second embodiment of the invention. As shown in FIG. 8, in the optical position detection device 10 according to the present embodiment, the linear light source member 13B used as the position detecting light source 12 is provided with a plurality of light emitting elements 120 arranged in the Y-axis direction, and each of the light emitting elements 120 emits the position detection light beam L2 of an infrared beam. Here, all of the plurality of light emitting elements 120 each have an optical axis directed in parallel to the X-Y plane (the screen surface 8a) of the detection area 10R, and the linear light source member 13B emits the detection light beams L2 in the directions along the X-Y plane (the screen surface 8a) of the detection area 10R. Although not shown in the drawings, the linear light source member 13A also has the configuration substantially the same as the linear light source member 13B.

In the linear light source members 13A, 13B thus configured, the light emitting elements 120 are driven by the light source drive section 14 explained with reference to FIG. 2 independently from each other. Therefore, by putting off all of the light emitting elements 120 of the linear light source member 13A while putting on all of the light emitting elements 120 of the linear light source member 13B, the X-coordinate detecting first light intensity distribution L2Xa shown in FIG. 4A can be formed. In contrast thereto, by putting on all of the light emitting elements 120 of the linear light source member 13A while putting off all of the light emitting elements 120 of the linear light source member 13B, the X-coordinate detecting second light intensity distribution L2Xb shown in FIG. 4B can be formed.

Further, by decreasing the intensity of the light emitting elements 120 in the linear light source member 13A in the Y-axis direction from the one side Y1 toward the other side Y2, the light intensity distribution shown in FIG. 3B can be formed, and by decreasing the intensity of the light emitting elements 120 in the linear light source member 13B in the Y-axis direction from the one side Y1 toward the other side Y2, the light intensity distribution shown in FIG. 3A can be formed. Therefore, by combining these light intensity distributions, the Y-coordinate detecting first light intensity distribution L2Ya shown in FIG. 4C can be formed. In contrast thereto, by decreasing the intensity of the light emitting elements 120 in the linear light source member 13A in the Y-axis direction from the other side Y2 toward the one side Y1, the light intensity distribution shown in FIG. 3C can be formed, and by decreasing the intensity of the light emitting elements 120 in the linear light source member 13B in the Y-axis direction from the other side Y2 toward the one side Y1, the light intensity distribution shown in FIG. 3D can be formed. Therefore, by combining these light intensity distributions, the Y-coordinate detecting second light intensity distribution L2Yb shown in FIG. 4D can be formed.

Further, by putting on all of the light emitting elements 120 of the linear light source member 13A while putting on all of the light emitting elements 120 of the linear light source member 13B, the Z-coordinate detecting light intensity distribution L2Z in which the intensity varies along the Z-axis direction can be formed.

Therefore, also in the optical position detection device 10 according to the present embodiment, the X-coordinate, Y-coordinate, and Z-coordinate of the target object Ob can be detected similarly to the first embodiment. Further, since the position detecting light sources 12 (the linear light source members 13A, 13B) emit the detection light beams L2 in the directions along the X-Y plane, the range in the Z-axis direction in which the X-coordinate detecting light intensity distribution and the Y-coordinate detecting light intensity distribution are formed can be limited. Therefore, since the light intensity distributions can be formed within the range limited in the Z-axis direction as appropriate distributions, substantially the same advantages as those of the first embodiment can be obtained such that the X-coordinate, Y-coordinate, and Z-coordinate of the target object Ob can be detected with a high accuracy.

Third Embodiment

Figure 9:
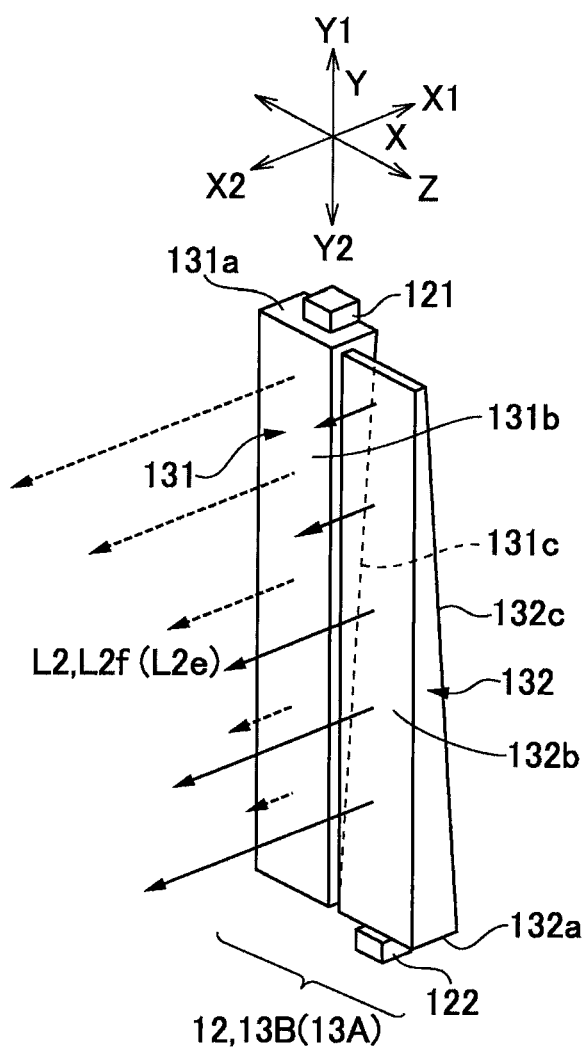
FIG. 9 is an explanatory diagram of a linear light source member used in an optical position detection device according to a third embodiment of the invention.

FIG. 9 is an explanatory diagram of a linear light source member used in the optical position detection device 10 according to a third embodiment of the invention. It should be noted that since the fundamental configuration of the present embodiment is substantially the same as the configuration explained with reference to FIGS. 7A through 7C, the explanation for the common part will be omitted.

Although in FIGS. 7A through 7C, and 8 the linear light source members 13A, 13B each having the plurality of light emitting elements 120 arranged in the Y-axis direction are used as the position detection light sources 12, in the present embodiment, the linear light source member 13B is provided with a first light emitting element 121, a first light guide member 131 having an entrance section 131a for the detection light beam emitted from the first light emitting element 121 and extending in the Y-axis direction, a second light emitting element 122, and a second light guide member 132 having an entrance section 132a for the detection light beam emitted from the second light emitting element 122 and extending in the Y-axis direction as shown in FIG. 9. Here, the first light guide member 131 and the second light guide member 132 overlap each other in the Z-axis direction. The first light emitting element 121 and the second light emitting element 122 are each composed of a light emitting diode for emitting an infrared beam, and the first light guide member 131 and the second light guide member 132 are each made of transmissive resin such as polycarbonate or acrylic resin.

The first light guide member 131 is provided with the entrance section 131a disposed at an end portion on the one side Y1 in the Y-axis direction, and the surface opposite to a light exit surface 131b directed toward the detection area 10R forms a tilted reflecting surface 131c. Therefore, the detection light beam L2 emitted from the first light emitting element 121 enters the first light guide member 131 from the entrance section 131a, and then proceeds inside the first light guide member 131 in the Y-axis direction from the one side Y1 toward the other side Y2 while being partially reflected by the tilted reflecting surface 131c to be emitted from the light exit surface 131b. Therefore, the intensity of the detection light beam L2 (the detection light beam L2f) emitted from the light exit surface 131b in the first light guide member 131 decreases in the Y-axis direction from the one side Y1 toward the other side Y2.

The second light guide member 132 is disposed in the opposite direction along the Y-axis direction to that of the first light guide member 131, and is provided with the entrance section 132a disposed at an end portion on the other side Y2 in the Y-axis direction, and the surface opposite to a light exit surface 132b directed toward the detection area 10R forms a tilted reflecting surface 132c. Therefore, the detection light beam L2 emitted from the second light emitting element 122 enters the second light guide member 132 from the entrance section 132a, and then proceeds inside the second light guide member 132 in the Y-axis direction from the other side Y2 toward the one side Y1 while being partially reflected by the tilted reflecting surface 132c to be emitted from the light exit surface 132b. Therefore, the intensity of the detection light beam L2 (the detection light beam L2f) emitted from the light exit surface 132b in the second light guide member 132 decreases in the Y-axis direction from the other side Y2 toward the one side Y1.

Here, the light exit surfaces 131b, 132b are parallel to the X-Y plane (the screen surface 8a). Therefore, the linear light source member 13B emits the detection light beam L2 (the detection light beam L2f) in a direction along the X-Y plane (the screen surface 8a). Although not shown in the drawings, the linear light source member 13A also has the configuration substantially the same as the linear light source member 13B.

In the linear light source members 13A, 13B thus configured, the light emitting elements 121, 122 are driven by the light source drive section 14 explained with reference to FIG. 2 independently from each other. Therefore, by putting on only the first light emitting element 121 of the linear light source member 13B, the light intensity distribution shown in FIG. 3A can be formed, and by putting on only the second light emitting element 122 of the linear light source member 13B, the light intensity distribution shown in FIG. 3D can be formed. Further, by putting on only the first light emitting element 121 of the linear light source member 13A, the light intensity distribution shown in FIG. 3B can be formed, and by putting on only the second light emitting element 122 of the linear light source member 13A, the light intensity distribution shown in FIG. 3C can be formed.

Therefore, by putting on the first light emitting element 121 and the second light emitting element 122 of the linear light source member 13B, the X-coordinate detecting first light intensity distribution L2Xa shown in FIG. 4A can be formed, and by putting on the first light emitting element 121 and the second light emitting element 122 of the linear light source member 13A, the X-coordinate detecting second light intensity distribution L2Xb shown in FIG. 4B can be formed. Therefore, by putting on the first light emitting element 121 of the linear light source member 13A and the first light emitting element 121 of the linear light source member 13B, the Y-coordinate detecting first light intensity distribution L2Ya shown in FIG. 4C can be formed, and by putting on the second light emitting element 122 of the linear light source member 13A and the second light emitting element 122 of the linear light source member 13B, the Y-coordinate detecting second light intensity distribution L2Yb shown in FIG. 4D can be formed.

Therefore, also in the optical position detection device 10 according to the present embodiment, the X-coordinate, Y-coordinate, and Z-coordinate of the target object Ob can be detected similarly to the first and second embodiments. Further, since the position detecting light sources 12 (the linear light source members 13A, 13B) emit the detection light beams L2 in the directions along the X-Y plane, the range in the Z-axis direction in which the X-coordinate detecting light intensity distribution and the Y-coordinate detecting light intensity distribution are formed can be limited. Therefore, since the light intensity distributions can be formed within the range limited in the Z-axis direction as appropriate distributions, substantially the same advantages as those of the first and second embodiments can be obtained such that the X-coordinate, Y-coordinate, and Z-coordinate of the target object Ob can be detected with a high accuracy.

Modified Example of Third Embodiment

Figure 10:
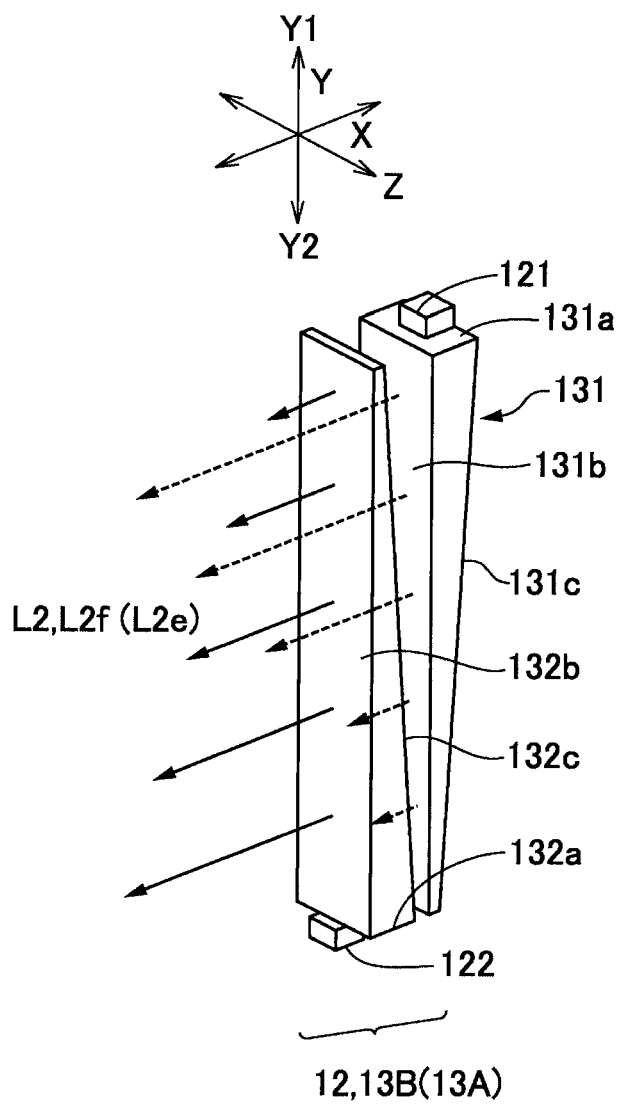
FIG. 10 is an explanatory diagram of a linear light source member used in an optical position detection device according to a modified example of the third embodiment of the invention.

FIG. 10 is an explanatory diagram of a linear light source member used in the optical position detection device 10 according to a modified example of the third embodiment of the invention. It should be noted that since the fundamental configuration of the present embodiment is substantially the same as the configuration explained with reference to FIG. 9, the explanation for the common part will be omitted.

Similarly to the example explained with reference to FIG. 9, also in the present example, the linear light source member 13A and the linear light source member 13B are each provided with the first light emitting element 121, the first light guide member 131 having an entrance section 131a for the detection light beam emitted from the first light emitting element 121 and extending in the Y-axis direction, a second light emitting element 122, and a second light guide member 132 having an entrance section 132a for the detection light beam emitted from the second light emitting element 122 and extending in the Y-axis direction as shown in FIG. 10.

Here, although in the example shown in FIG. 9 the first light guide member 131 and the second light guide member 132 overlap each other in the Z-axis direction, in the present example the first light guide member 131 and the second light guide member 132 overlap each other in the X-axis direction. Therefore, the detection light beam L2 emitted from the second light guide member 132 is emitted directly to the detection area 10R, and the detection light beam L2 emitted from the first light guide member 131 is emitted to the detection area 10R after transmitted through the second light guide member 132.

Also in the optical position detection device 10 configured as described above, the X-coordinate, Y-coordinate, and Z-coordinate of the target object Ob can be detected similarly to the first and second embodiments. Further, since the position detecting light sources 12 (the linear light source members 13A, 13B) emit the detection light beams L2 in the directions along the X-Y plane, the range in the Z-axis direction in which the X-coordinate detecting light intensity distribution and the Y-coordinate detecting light intensity distribution are formed can be limited. Therefore, since the light intensity distributions can be formed within the range limited in the Z-axis direction as appropriate distributions, substantially the same advantages as those of the first and second embodiments can be obtained such that the X-coordinate, Y-coordinate, and Z-coordinate of the target object Ob can be detected with a high accuracy.

Modified Example of Second and Third Embodiments

Figure 11A:
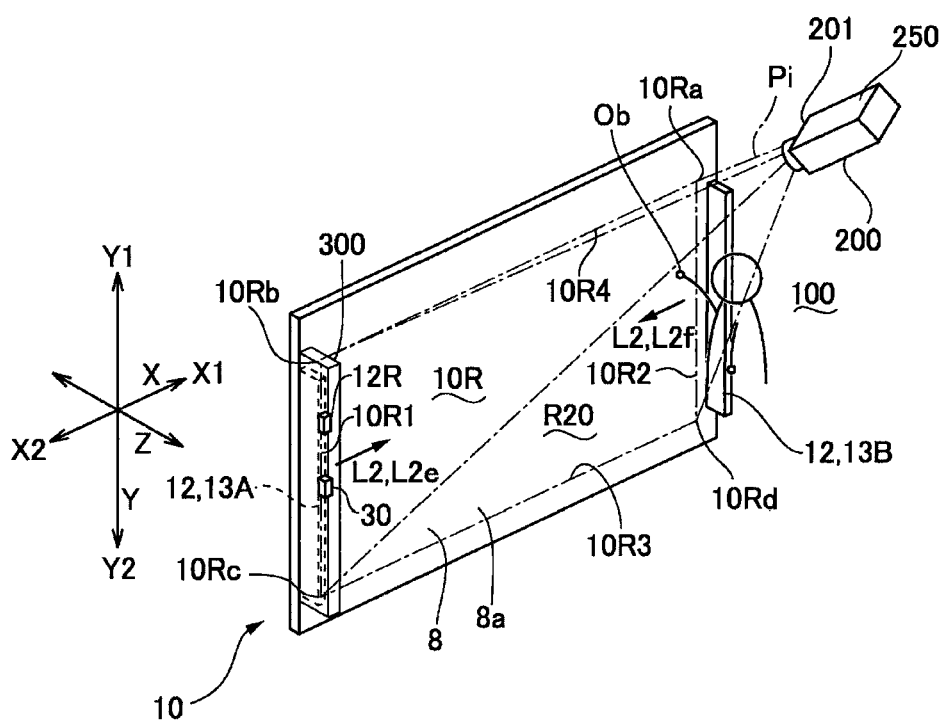
FIGS. 11A through 11C are explanatory diagrams schematically showing a configuration of a display device with a position detection function according to a modified example of the second and third embodiments of the invention.
Figures 11B, 11C:
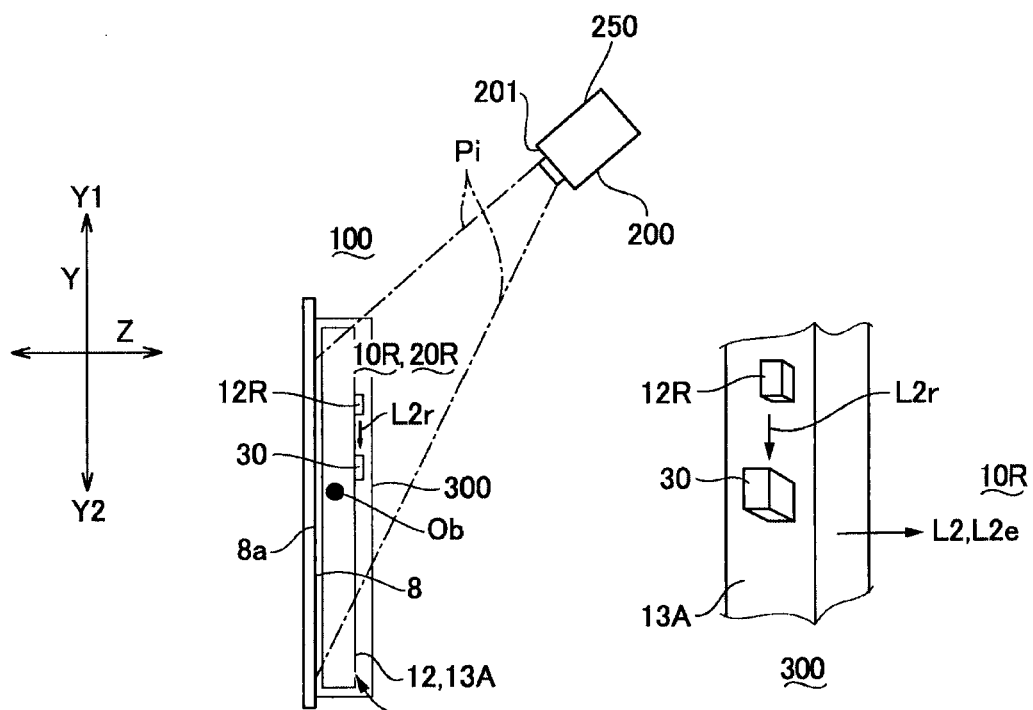
Figure 12:
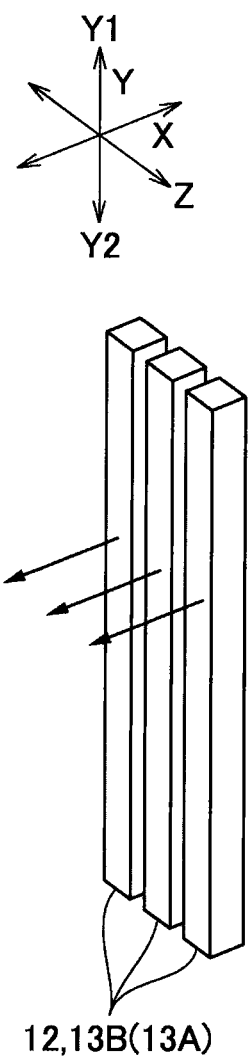
FIG. 12 is an explanatory diagram of the linear light source member used in the optical position detection device formed in the display device with a position detection function shown in FIGS. 11A through 11C.

FIGS. 11A through 11C are explanatory diagrams schematically showing a configuration of a display device 100 with a position detection function according to a modified example of the second and third embodiments of the invention, wherein FIG. 11A is an explanatory diagram schematically showing an appearance of a substantial part of the display device 100 with a position detection function viewed from obliquely above, FIG. 11B is an explanatory diagram schematically showing an appearance thereof viewed from a lateral side, and FIG. 11C is an explanatory diagram showing the periphery of the light detector (the periphery of the optical unit) in an enlarged manner. FIG. 12 is an explanatory diagram of the linear light source member used in the optical position detection device 10 formed in the display device 100 with a position detection function shown in FIGS. 11A through 11C. It should be noted that since the fundamental configuration of the present example is substantially the same as the configuration of the second and third embodiments, the explanation for the common part will be omitted.

As shown in FIGS. 11A and 11B, the display device 100 with a position detection function according to the present example is also provided with the pair of linear light source members 13A, 13B disposed on the both sides sandwiching the detection area 10R in the X-axis direction and extending in the Y-axis direction as the plurality of position detection light sources 12 for emitting the detection light beams L2 toward the detection area 10R when configuring the optical position detection device 10 similarly to the second and third embodiments. More specifically, the optical position detection device 10 is provided with the linear light source member 13A extending in the Y-axis direction along the side 10R1 of the detection area 10R and emitting the detection light beam L2 (a detection light beam L2e), and the linear light source member 13B extending in the Y-axis direction along the side 10R2 opposite to the side 10R1 in the detection area 10R and emitting the detection light beam L2 (a detection light beam L2f). Further, the optical position detection device 10 is also provided with the light detector 30 in the present embodiment similarly to the first embodiment. Here, as shown in FIGS. 11A, 11B, and 11C, the light detector 30 constructs the optical unit 300 together with the linear light source member 13A out of the plurality of position detecting light sources 12 (the linear light source members 13A, 13B) similarly to the second and third embodiments. Further, the optical unit 300 is also provided with the reference light source 12R, and the reference light source 12R emits the reference light beam L2r directly entering the light detector 30 without passing through the detection area 10R.

Here, the position detecting light sources 12 used in the present example each have a size in the Z-axis direction larger than that of the position detecting light sources 12 used in the second and third embodiments, and the size of the detection area 10R in the Z-axis direction is larger accordingly.

In configuring such an optical position detection device 10, in the present example, the position detecting light source 12 extending along the side 10R2 of the detection area 10R out of the pair of position detecting light sources 12 has the linear light source members 13B explained with reference to FIG. 8, 9, or 10 stacked in the Z-axis direction in a multiple-stage manner as show in FIG. 12. In the position detecting light sources 12 according to the present example, the linear light source members 13B are stacked in the Z-axis direction in a three-stage manner. It should be noted that although not shown in the drawings, also in the position detecting light source 12 extending along the side 10R1 of the detection area 10R, the linear light source members 13A are stacked in the Z-axis direction in a three-stage manner.

Also in the optical position detection device 10 configured as described above, the X-coordinate, Y-coordinate, and Z-coordinate of the target object Ob can be detected similarly to the first through third embodiments. Further, since the position detecting light sources 12 (the linear light source members 13A, 13B) emit the detection light beams L2 in the directions along the X-Y plane, the range in the Z-axis direction in which the X-coordinate detecting light intensity distribution and the Y-coordinate detecting light intensity distribution are formed can be limited. Therefore, since the light intensity distributions can be formed within the range limited in the Z-axis direction as appropriate distributions, substantially the same advantages as those of the first embodiment can be obtained such that the X-coordinate, Y-coordinate, and Z-coordinate of the target object Ob can be detected with a high accuracy.

Further, since in the present embodiment, the position detecting light sources 12 have configurations of stacking the linear light source members 13A, 13B in the Z-axis direction in a multiple-stage manner, respectively, the size of the detection area 10R in the Z-axis direction is large. Therefore, the X-coordinate, Y-coordinate, and Z-coordinate of the target object Ob can be detected in a wide range in the Z-axis direction.

Error Correction Method

Then, an error correction method, which can be adopted in the optical position detection device 10 to which the invention is applied, will be explained.

First Example of Error Correction Method

Figure 13A:
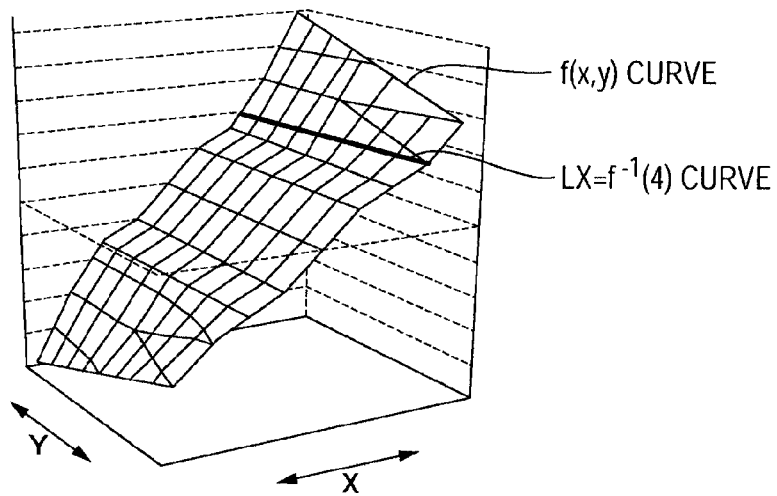
FIGS. 13A through 13C are explanatory diagrams showing a first example of an error correction method in the display device with a position detection function according to the invention.
Figure 13B:
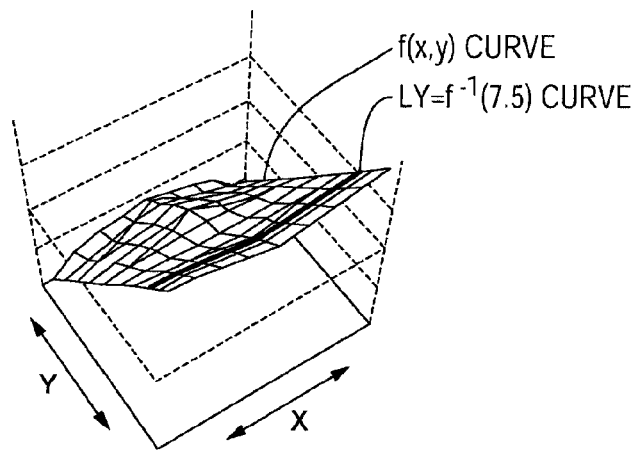
Figure 13C:
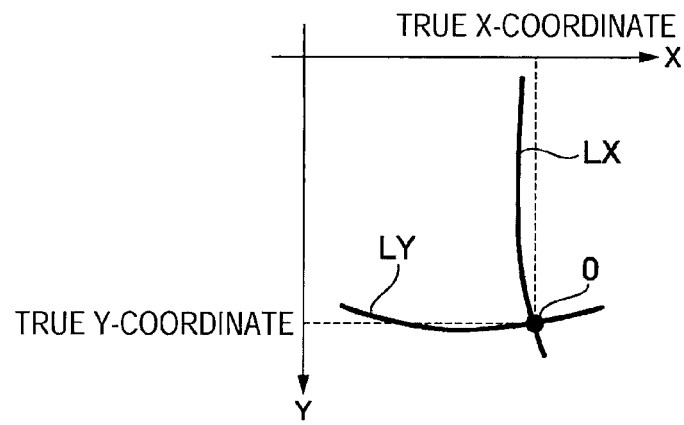

FIGS. 13A through 13C are explanatory diagrams showing a first example of the error correction method in the optical position detection device 10 according to the invention, wherein FIG. 13A is an explanatory diagram of correcting the X-coordinate position, FIG. 13B is an explanatory diagram of correcting the Y-coordinate position, and FIG. 13C is an explanatory diagram showing how to obtain the coordinate position.

In the optical position detection device 10 according to the present example, when detecting the X-coordinate of the target object Ob, there is used the X-coordinate detecting light intensity distribution in which the intensity decreases monotonically in the X-axis direction and is kept constant in the Y-axis direction as shown in FIGS. 4A, 4B, 5A, and 5B. However, in reality, the intensity might vary in the Y-axis direction as shown in FIG. 13A. Further, the intensity might vary in the X-axis direction in the Y-coordinate detecting light intensity distribution as shown in FIG. 13B. As a result, if the position of the target object Ob is detected, the position on the distorted detection area 10R might be detected. Therefore, in the present example, a function or the inverse function thereof defining the relationship between the result obtained via the light detector 30 at each position of the detection area 10R and the coordinate position on the detection area 10R is previously stored in the storage section (not shown) of the position detection section 50 shown in FIG. 2. Then, the position detection section 50 determines the position of the target object Ob using the function or the inverse function thereof stored in the storage section, and based on the inverse function and the reception intensity obtained via the light detector 30.

In explaining the correction method with reference to FIGS. 13A through 13C, for the sake of easy understanding of the fundamental principle thereof, it is assumed that the correction explained below is performed on the reception intensity itself obtained via the light detector 30 at each position of the detection area 10R.

In the present example, the function f(x.y) of the curve defining the light intensity distribution is firstly obtained, and then the inverse function $f^{-1}(p)$ (p denotes the light intensity (the result obtained via the light detector 30)) is stored in the storage section.

Then, when determining the X-coordinate position of the target object Ob, the reception intensity p obtained via the light detector 30 is substituted in the inverse function $f^{-1}(p)$ to thereby obtain the position of the target object Ob on the detection area 10R. For example, if the reception intensity p obtained via the light detector 30 is 4, the inverse function $f^{-1}(4)$ is obtained. The result is indicated by the heavy line LX in FIG. 13A.

Then, when determining the Y-coordinate position of the target object Ob, the reception intensity p obtained via the light detector 30 is substituted in the inverse function $f^{-1}(p)$ to thereby obtain the position of the target object Ob on the detection area 10R. For example, if the reception intensity p obtained via the light detector 30 is 7.5, the inverse function $f^{-1}(7.5)$ is obtained. The result is indicated by the heavy line LY in FIG. 13B.

Therefore, as shown in FIG. 13C, the position of the target object Ob can be obtained as an intersecting point O obtained when projecting the heavy line LX shown in FIG. 13A and the heavy line LY shown in FIG. 13B on the (X,Y)-coordinate. The position of the target object Ob obtained by such a method is the true position obtained by correcting the error due to the shift from the linear relationship of the light intensity distribution in the detection area 10R. Therefore, according to the present example, the position of the target object Ob can correctly be determined.

It should be noted that although in the present example the inverse function $f^{-1}(p)$ is stored in the storage section, it is also possible to store the f(x,y) itself in the storage section.

Second Example of Error Correction Method

Figure 14A:
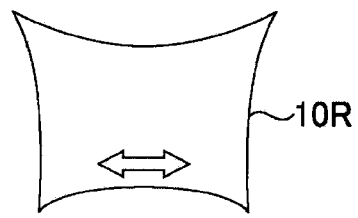
FIGS. 14A through 14C are explanatory diagrams showing a second example of the error correction method in the display device with a position detection function according to the invention.
Figure 14B:
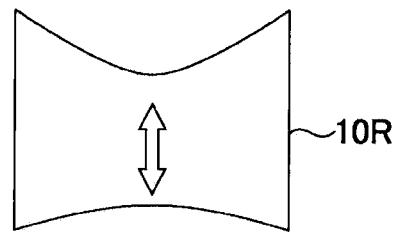
Figure 14C:
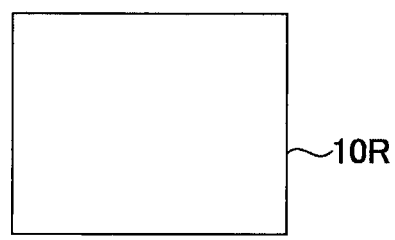

FIGS. 14A through 14C are explanatory diagrams showing a second example of the error correction method in the optical position detection device 10 according to the invention. According to the present example, the position detection section 50 shown in FIG. 2 previously stores, in the storage section (not shown), correction information for correcting a calculation result of the coordinate in the case of assuming the light intensity distribution of the detection light beam L2 in the detection area 10R as a linear relationship. Then, when determining the X-coordinate of the target object Ob, the position of the target object Ob in the X-axis direction is determined based on the calculation result of the X-coordinate obtained in the condition in which the light intensity distribution of the detection light beam L2 is assumed as the linear relationship, and the correction information stored in the storage section. As a result, the shape of the detection area 10R distorted in both of the X-axis direction and the Y-axis direction as shown in FIG. 14A can be changed to be a shape corrected in the X-axis direction as shown in FIG. 14B. Further, when determining the Y-coordinate of the target object Ob, the position of the target object Ob in the Y-axis direction is determined based on the calculation result of the Y-coordinate obtained in the condition in which the light intensity distribution of the detection light beam L2 is assumed as the linear relationship, and the correction information stored in the storage section. As a result, the shape of the detection area 10R distorted in the Y-axis direction as shown in FIG. 14B can be corrected as shown in FIG. 14C.

It should be noted that in the present example, a coefficient for performing an operation on the calculation result of the coordinate in the case in which the light intensity distribution of the detection light beam L2 is assumed as the linear relationship, a look-up table in which the coordinates before and after the correction correspond to each other, and so on can be used as the correction information.

Third Example of Error Correction Method

Figure 15A:
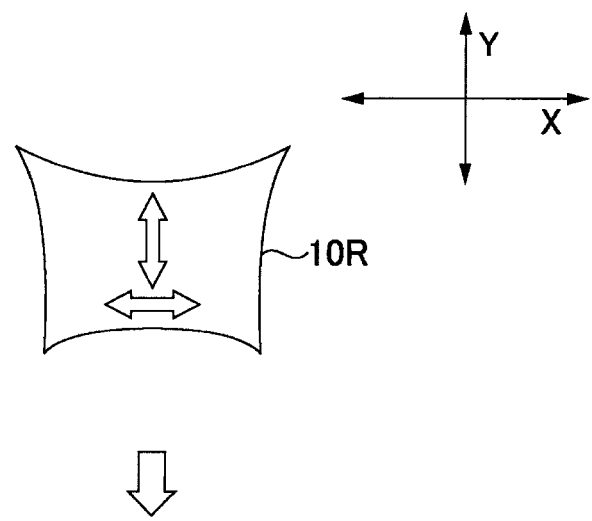
FIGS. 15A and 15B are explanatory diagrams showing a third example of the error correction method in the display device with a position detection function according to the invention.
Figure 15B:
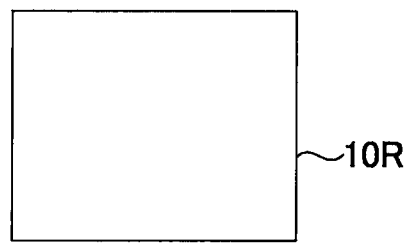

FIGS. 15A and 15B are explanatory diagrams showing a third example of the error correction method in the optical position detection device 10 according to the invention. Also in the present example similarly to the second example, the position detection section 50 shown in FIG. 2 previously stores, in the storage section, correction information for correcting a calculation result of the coordinate in the case of assuming the light intensity distribution of the detection light beam L2 in the detection area 10R as a linear relationship. Then, when determining the (X,Y)-coordinate of the target object Ob, firstly, the X-coordinate and the Y-coordinate in the condition in which the light intensity distribution of the detection light beam L2 is assumed as the linear relationship are calculated. Then, the X-coordinate and the Y-coordinate of the target object Ob are determined based on the X-coordinate and the Y-coordinate described above, and the correction information stored in the storage section. As a result, as shown in FIG. 15A, the shape of the detection area 10R distorted in both of the X-axis direction and the Y-axis direction can be corrected as shown in FIG. 15B.

It should be noted that in the present example, a coefficient for performing an operation on the calculation result of the coordinate in the case in which the light intensity distribution of the detection light beam L2 in the detection area 10R is assumed as the linear relationship, a look-up table in which the coordinates before and after the correction correspond to each other, and so on can be used as the correction information.

The entire disclosure of Japanese Patent Application No. 2009-279202, filed Dec. 9, 2009 is expressly incorporated by reference herein.

What is claimed is:

1. An optical position detection device comprising:
a detecting light source section adapted to emit a detection light beam on a screen member having four corners;
a light source drive section adapted to drive the detecting light source section to form an X-coordinate detecting light intensity distribution in which an intensity of the detection light beam varies in an X-axis direction, and a Y-coordinate detecting light intensity distribution in which an intensity of the detection light beam varies in a Y-axis direction intersecting the X-axis direction;
a light detection section adapted to receive the detection light beam reflected by a target object located near the screen member;
a position detection section adapted to detect a position of the target object based on a reception intensity in the light detection section;
a reference light source section adapted to emit a reference light beam entering the light detection section, the light detection section detecting reception reference light intensity of the entered reference light beam; and
a case adapted to contain the light detection section and the reference light source section, wherein
the light detection section and the reference light source are relatively located in the case in a state in which the reference light beam emitted from the reference light source travels directly to the light detection section without reflecting at the target object so that the reception reference light intensity is constant irrespective of the position of the target object,
the light detection section is located next to the detecting light source section, and
the detecting light source section and the light detection section are located at one of the four corners of the screen member.

2. The optical position detection device according to claim 1, wherein
the light source drive section turns on the reference light source section and the detecting light source section at respective timings different from each other.

3. The optical position detection device according to claim 1, wherein
the detecting light source section is provided with a plurality of light emitting elements having respective optical axes directed differently from each other.

4. The optical position detection device according to claim 1, wherein
the detecting light source section is provided with a pair of linear light source members extending in the Y-axis direction and arranged in parallel in the X-axis direction.

5. The optical position detection device according to claim 4, wherein
the linear light source members are each provided with a plurality of light emitting elements arranged in the Y-axis direction.

6. The optical position detection device according to claim 4, wherein
the linear light source members are each provided with
a first light emitting element,
a first light guide member having an entrance section of the detection light beam emitted from the first light emitting element, and extending in the Y-axis direction, an inside of which the detection light beam emitted from the first light emitting element proceeds through in the Y-axis direction from one side to the other side,
a second light emitting element, and
a second light guide member having an entrance section of the detection light beam emitted from the second light emitting element, and extending in the Y-axis direction, an inside of which the detection light beam emitted from the second light emitting element proceeds through in the Y-axis direction from the other side to the one side.

7. The optical position detection device according to claim 1, wherein
the position detection section corrects the reception intensity so that a distribution of the reception intensity corresponding to one of the X-coordinate detecting light intensity distribution and the Y-coordinate detecting light intensity distribution becomes an intensity distribution in which the intensity decreases monotonically in a linear manner.

8. A display device with a position detection function, comprising:
optical position detection device according to claim 1; and
an image generation device adapted to display an image on a plane defined by the X-axis and the Y-axis.

9. The optical position detection device according to claim 1, wherein
the light source drive section drives the detecting light source section based on the reception reference light intensity.

* * * * *